US006884171B2

(12) United States Patent
Eck et al.

(10) Patent No.: US 6,884,171 B2
(45) Date of Patent: Apr. 26, 2005

(54) VIDEO GAME DISTRIBUTION NETWORK

(75) Inventors: Charles P. Eck, Redmond, WA (US);
Scott Elliott, Redmond, WA (US);
Hiroshi Kamada, Redmond, WA (US);
Patrick Link, Redmond, WA (US);
David McCarten, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 56 days.

(21) Appl. No.: 09/954,436

(22) Filed: Sep. 18, 2001

(65) Prior Publication Data

US 2002/0045484 A1 Apr. 18, 2002

Related U.S. Application Data

(60) Provisional application No. 60/233,622, filed on Sep. 18, 2000.

(51) Int. Cl.[7] ............................................... A63F 13/00
(52) U.S. Cl. ........................................................ 463/42
(58) Field of Search ............................... 463/3, 29, 30, 463/39–44; 346/2.1; 703/21, 23; 717/172; 360/131; 725/74, 75–77

(56) References Cited

U.S. PATENT DOCUMENTS

| 4,481,529 | A | 11/1984 | Kerling |
| 4,516,777 | A | 5/1985 | Nikora |
| 4,542,903 | A | 9/1985 | Yokoi et al. |

(Continued)

FOREIGN PATENT DOCUMENTS

| EP | 0 960 637 | 12/1999 |
| JP | 63-242293 | 10/1988 |
| JP | 4-49989 | 2/1992 |
| JP | 4-140791 | 5/1992 |
| JP | 4-140792 | 5/1992 |
| JP | 7-204349 | 8/1995 |
| JP | 10-137447 | 5/1998 |
| JP | 10-328408 | 12/1998 |
| JP | 11-207034 | 8/1999 |
| JP | 11-333144 | 12/1999 |
| WO | WO 0039693 | 7/2000 |
| WO | WO 02/06941 A2 | 1/2002 |
| WO | WO 02/06947 A2 | 1/2002 |
| WO | WO 02/08905 A2 | 1/2002 |
| WO | WO 02/08905 A3 | 1/2002 |

OTHER PUBLICATIONS

NO$GMB, NO$GMB Homepage, http://work.de/nocash/gmb.htm, circa 1997.*
NO$GMB, NO$GMB Freeware Page, http://www.work.de/nocash/gmbfreew.htm, circa 1997.*
PDROMS, PDROM Homepage, http://www.pdroms.de, circa 1998.*
MAME: The Official Multiple Arcade Machine Emulator Site, circa 1997, http://www.mame.net.*
MAME Readme: circa 1997, http://www.mame.net/readme.html.*

(Continued)

Primary Examiner—Michael O'Neill
(74) Attorney, Agent, or Firm—Nixon & Vanderhye P.C.

(57) ABSTRACT

A video game distribution network for use in airlines, trains, hotels, cruise ships, set top boxes, cable television systems, satellite and other wireless systems or other communications systems, distributes special purpose game binary image files to general purpose computing/display devices. Software emulators running on the general purpose computing/display devices model the game source platform and interpret and/or compile the game files to provide interactive video game play. Software emulators for emulating a handheld video game platform such as GAME BOY®, GAME BOY COLOR® and/or GAME BOY ADVANCE® on a low-capability target platform (e.g., a seat-back display for airline or train use, a personal digital assistant, a cell phone) may provide any number of features and optimizations to provide high quality graphics and sound that nearly duplicates the game playing experience on the native platform.

60 Claims, 47 Drawing Sheets

U.S. PATENT DOCUMENTS

| | | | |
|---|---|---|---|
| 4,628,304 A | | 12/1986 | Bottiau |
| 4,756,528 A | * | 7/1988 | Umashankar ............... 463/1 |
| 4,924,413 A | | 5/1990 | Suwannukul |
| 4,931,860 A | | 6/1990 | Narumiya |
| 4,979,738 A | | 12/1990 | Frederiksen |
| 5,095,798 A | | 3/1992 | Okada et al. |
| 5,134,391 A | | 7/1992 | Okada |
| 5,184,830 A | | 2/1993 | Okada et al. |
| 5,265,888 A | | 11/1993 | Yamamoto et al. |
| 5,300,944 A | | 4/1994 | Shapiro et al. |
| 5,395,112 A | | 3/1995 | Darling |
| 5,400,053 A | | 3/1995 | Johary et al. |
| 5,442,375 A | | 8/1995 | Wojaczynski et al. |
| 5,552,799 A | | 9/1996 | Hashiguchi |
| 5,559,954 A | | 9/1996 | Sakoda et al. |
| 5,759,104 A | | 6/1998 | Shirae et al. |
| 5,768,593 A | | 6/1998 | Walters et al. |
| 5,785,598 A | | 7/1998 | Hsu |
| 5,790,096 A | | 8/1998 | Hill, Jr. |
| 5,793,351 A | | 8/1998 | Leach |
| 5,844,532 A | | 12/1998 | Silverbrook et al. |
| 6,020,751 A | | 2/2000 | Rampone et al. |
| 6,047,373 A | | 4/2000 | Hall et al. |
| 6,058,288 A | * | 5/2000 | Reed et al. ............. 455/3.06 |
| 6,390,920 B1 | * | 5/2002 | Infiesto et al. ............. 463/42 |
| 6,409,602 B1 | * | 6/2002 | Wiltshire et al. .......... 463/42 |
| 6,468,160 B1 | * | 10/2002 | Eliott ..................... 463/43 |

OTHER PUBLICATIONS

MAME FAQs: circa 1997, http://www.mame.net/mame-faq.html.*

NO$GMB FAQs: circa 1997, published with program downloaded from http://www.work.de/nocash/gmb.htm.*

CD containing the following files: Donkey1.zip file, S9x_windows_119a36_i386.zip, smygb02.zip, yoshi.GB.

Directory listings of the files on CD.

Printout of windows.txt file, "Snes9X: The Portable Super Nintendo Entertainment System Emulator," v1.19 (Jun. 5, 1999).

Printout of Readme.txt, "Snes9X: The Portable Super Nintendo Entertainment System Emulator," v1.19 (Jun. 5, 1999).

Printout of Readmee.txt, "SMYGB—Game Boy Emulator v0.20," by Ming–yu Shih (Jan. 2, 1999).

U.S. Appl. No. 09/617,709.

U.S. Appl. No. 09/617,669.

U.S. Appl. No. 09/617,624.

"Professional Power," *Sinclair Research promotional brochure* (1982), found at http://www.nvg.ntnu.no/sinclair/computers/zxspectrum/professional_power.htm.

"ZX Spectrum Technical Data," *Sinclair Research* leaflet (1982), found at http://www.nvg.ntnu.no/sinclair/computers/zxspectrum/spec_technical.htm.

Computer Closet Collection, NEC Turbo Express, printed from wysiqyg://22/http://www.geocities.com/~compcloset/NECTurboExpress.htm on Sep. 28, 2000 (2 pages), copyright 1997–1999, last modified Jun. 24, 1999.

NEC Turbo Express, printed from http://www.edu.uni-k-lu.ac.at/~kseiner/express.html on Sep. 28, 2000 (2 pages), document date unknown.

Turbo Express FAQ, printed from http://www.gameconsole-s.com/turboexp_faq.htm on Sep. 28, 2000 (18 pages), last revision of document: May 25, 1995.

Computer Closet Collection, Sega Game Gear, printed from wysiwyg://28/http://www.geocities.com/~compcloset/SegaGameGear.htm on Sep. 28, 2000 (2 pages), copyright 1997–1999, last modified Jun. 22, 1999.

The Real Game Gear FAQ, Version GG.04, Dec. 1999, printed from http://www.classicgaming.com/museum/realggfaq.txt on Sep. 28 (32 pages).

Computer Closet Collection, Atari Lynx, printed from wysiwyg://12/http://www.geocities.com/~compcloset/AtariLynx.htm on Sep. 28, 2000 (2 pages), copyright 1997–1999, last modified Jun. 22, 1999.

[FAQ] Atari Lynx Frequently–Asked Questions, printed from http://www.landfield.com/faqs/games/video–games/atari/lynx on Sep. 28, 2000 (16 pages), last revision of document: May 1, 2000.

Computer Closet Collection, Nintendo Game Boy/Game Boy Light, printed from wysiwyg://40/http://www.geocities.com/~compcloset/NintendoGameBoy.htm on Sep. 28, 2000 (5 pages), copyright 1997–1999, last modified Jun. 22, 1999.

Computer Closet Collection, Milton–Bradley Microvision, printed from wysiwyg://52/http://www.geocities.com/~compcloset/MiltonBradley–Microvision.htm on Sep. 28, 2000 (2 pages), copyright 1997–1999, last modified Jun. 22, 1999.

Microvision FAQ Version 0.08, copyright 1994, 1995, printed from http://www.gameconsoles.com/microvision_faq.htm on Sep. 28, 2000 (13 pages).

Computer Closet Collection, Sega Nomad, printed from wysiwyg://34/http://www.geocities.com/~compcloset/SegaNomad.htm on Sep. 28, 2000 (2 pages), copyright 1997–1999, last modified Jun. 22, 1999.

Sega Nomad Press Announcement of Aug. 22, 1995, printed from http://gamezero.com/team–0/whats_new/past/nomad/html on Sep. 28, 2000 (2 pages).

Computer Closet Collection, Tiger Game.com, printed from wysiwyg://46/http://www.geocities.com/~compcloset/TigerGameCom.htm on Sep. 28, 2000 (1 page), copyright 1997–1999, last modified Jun. 22, 1999.

Tiger Game.Com, "Low Cost, Big Games", printed from http://gamecenter.com/Consoles/Features/Pocket/ss02.html on Sep. 28, 2000 (2 pages), document date unknown.

* cited by examiner

Pokémon Gold

Gotta catch 'em even more! Enter a whole new world with new Pokémon to capture, train, and battle. Meet Professor Elm and get the all new Pokégear including map, radio, cell phone, and clock. Set the clock. Then watch as day turns to night and events take place in real time. And be sure to keep an eye out for Pokémon that come out only at night! Dozens of never-before-seen Pokémon. Find new evolutions for some familiar Pokémon and discover a whole new species.

A Button:   Select a command; talk to a person in front of you;
            check out an item in front of you;
            scroll through text B Button:   Cancel a command

---

Ⓑ Return to Menu     [ Mode ]  Quit

*Fig. 2G*

Timer Table

N is original value
N' is the decremented value

| | | |
|---|---|---|
| A | A' | 0 |
| B | B' | 1 |
| C | C' | 2 |
| D | D' | 4 |

Keeps track of CGB Vsynch and Hsynch

| | | |
|---|---|---|
| | | Horizontal |
| | | Vertical |

*Fig. 2L*

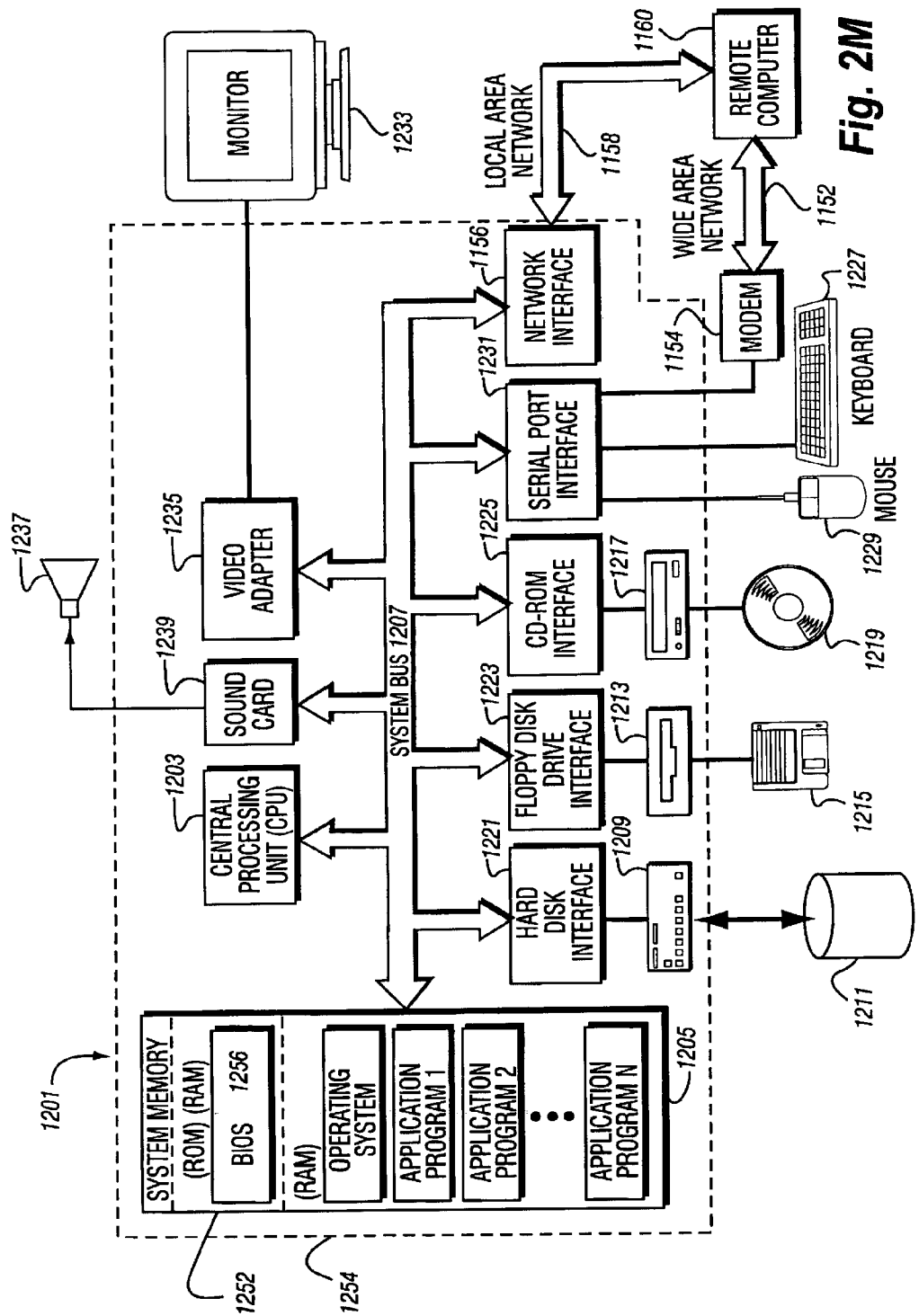

Fig. 6

Compatibility modes:

| CGB_INCOMPATIBLE |
| --- |
| CGB_COMPATIBLE |
| CGB_EXCLUSIVE |
| AGB |

Registration Data Locations:

| ROMREG_CGB |
| --- |
| ROMREG_CARTRIDGE |
| ROMREG_ROM |
| ROMREG_RAM |

Fig. 7

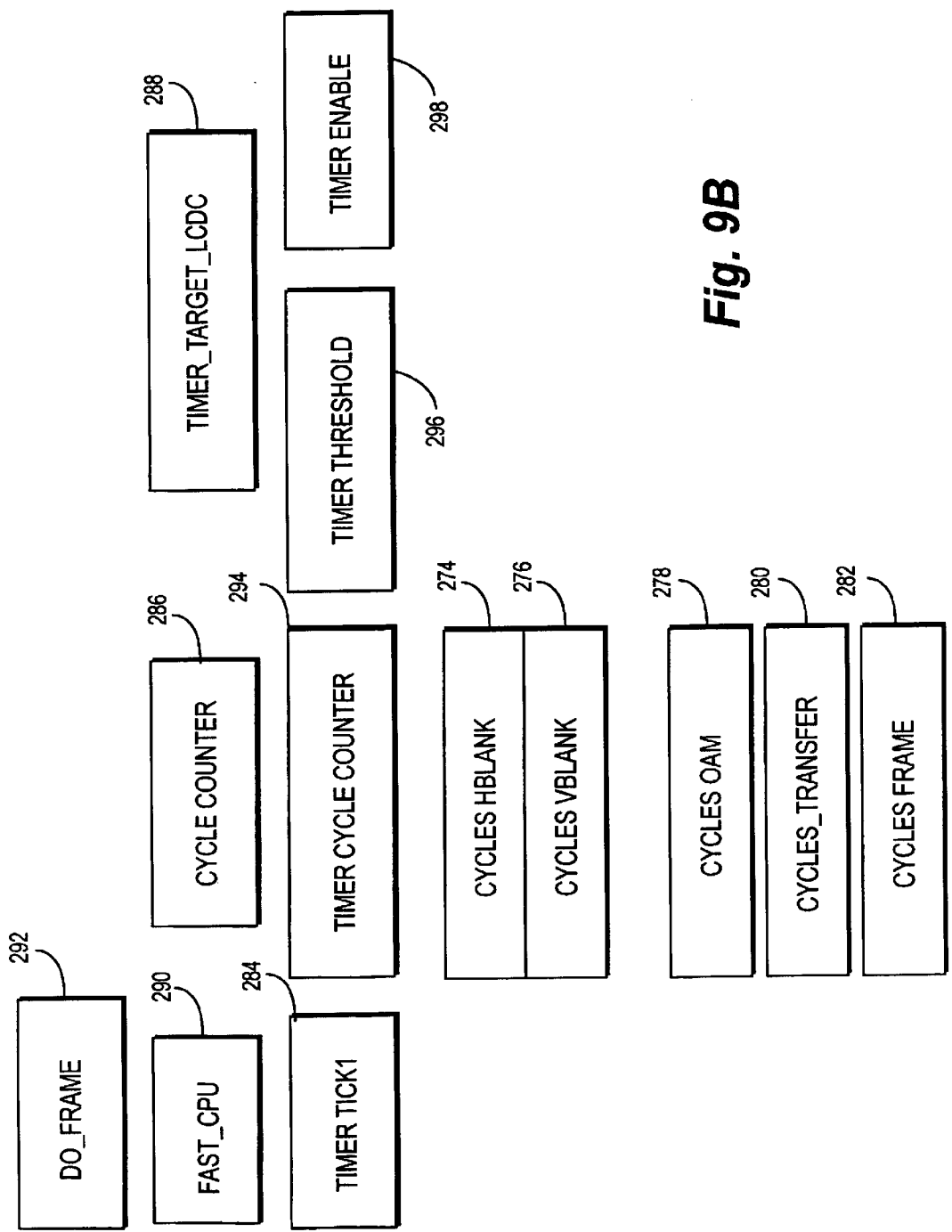

| Cycles per Event | DMG | CGB |
|---|---|---|
| HBLANK | 56 (51) | 112 |
| OAM SEARCH | 26 (21) | 52 |
| OAM TRANSFER | 47 (42) | 94 |
| VBLANK | (HBLANK + OAM + TRANSFER) | (HBLANK + OAM + TRANSFER - 30) |
| FRAME | (VBLANK * 154) | (VBLANK * 154) |

Fig. 9C

| 178a | PTR | FUNCT |
|---|---|---|
| | PTR | FUNCT |
| | PTR | FUNCT |

READ POINTER TABLE

⋮

| | PTR | FUNCT |
|---|---|---|
| | PTR | FUNCT |
| | PTR | FUNCT |

| 178b | PTR | FUNCT |
|---|---|---|
| | PTR | FUNCT |
| | PTR | FUNCT |

WRITE POINTER TABLE

⋮

| PTR | FUNCT |
|---|---|
| PTR | FUNCT |
| PTR | FUNCT |

| REGISTERS | |
|---|---|
| P1 | 0xFF00 |
| SB | 0xFF01 |
| SC | 0xFF02 |
| DIV | 0xFF04 |
| TIMA | 0xFF05 |
| TMA | 0xFF06 |
| TAC | 0xFF07 |
| IF | 0xFF0F |
| NR10 | 0xFF10 |
| NR11 | 0xFF11 |
| NR12 | 0xFF12 |
| NR13 | 0xFF13 |
| NR14 | 0xFF14 |
| NR21 | 0xFF16 |
| NR22 | 0xFF17 |
| NR23 | 0xFF18 |
| NR24 | 0xFF19 |
| NR30 | 0xFF1A |
| NR31 | 0xFF1B |
| NR32 | 0xFF1C |
| NR33 | 0xFF1D |
| NR34 | 0xFF1E |
| NR41 | 0xFF20 |
| NR42 | 0xFF21 |
| NR43 | 0xFF22 |
| NR44 | 0xFF23 |
| NR50 | 0xFF24 |
| NR51 | 0xFF25 |
| NR52 | 0xFF26 |
| LCDC | 0xFF40 |
| STAT | 0xFF41 |
| SCY | 0xFF42 |
| SCX | 0xFF43 |
| LY | 0xFF44 |
| LYC | 0xFF45 |
| DMA | 0xFF46 |
| BGP | 0xFF47 |
| OBP0 | 0xFF48 |
| OBP1 | 0xFF49 |
| WY | 0xFF4A |
| WX | 0xFF4B |
| KEY1 | 0xFF4D |
| VBK | 0xFF4F |
| HDMA1 | 0xFF51 |
| HDMA2 | 0xFF52 |
| HDMA3 | 0xFF53 |
| HDMA4 | 0xFF54 |
| HDMA5 | 0xFF55 |
| BCPS | 0xFF68 |
| BCPD | 0xFF69 |
| OCPS | 0xFF6A |
| OCPD | 0xFF6B |
| SVBK | 0xFF70 |
| IE | 0xFFFF |

| LCDC_BG | 0X01 |
|---|---|
| LCDC_OBJ | 0x02 |
| LCDC_OBJSIZE | 0x04 |
| LCDC_BGCODE | 0x08 |
| LCDC_BGCHR | 0x10 |
| LCDC_WINDOW | 0x20 |
| LCDC_WINCODE | 0x40 |
| LCDC_CONTROL | 0x80 |

| STAT_MATCH | 0X04 |
|---|---|
| STAT_INT_HBLANK | 0x08 |
| STAT_INT_VBLANK | 0x10 |
| STAT_INT_OAM | 0x20 |
| STAT_INT_MATCH | 0x40 |

Fig. 28

| VIDEO_INT | 0x10 |
|---|---|
| SET_MODE | 0x00 |
| VGA_256_COLOR_MODE | 0x13 |
| TEXT_MODE | 0x03 |
| REGISTER_MASK | 0x3C6 |
| COLOR_INDEX | 0x3C8 |
| PALETTE_REG | 0x3C9 |
| INPUT_STATUS_1 | 0x3DA |
| VRETRACE | 0x08 |

| GE_DESTINATION_BASE | 0x018 |
|---|---|
| GE_DESTINATION_PITCH | 0x028 |
| GE_DESTINATION_XY | 0x10000 |
| GE_HEIGHT | 0x048 |
| GE_PIXEL_DEPTH | 0x07C |
| GE_RASTER_OP | 0x08C |
| GE_SOURCE_BASE | 0x098 |
| GE_SOURCE_PITCH | 0x0AC |
| GE_SOURCE_XY | 0x0BC |
| GE_WIDTH | 0xC8 |

Fig. 29

VIDEO GAME DISTRIBUTION NETWORK

CROSS REFERENCE TO RELATED APPLICATIONS

Priority is claimed from provisional application number 60/233,622 filed Sep. 18, 2000 entitled "Method and Apparatus for Emulating a Portable Game Machine," incorporated herein by reference.

This application is related to the following copending commonly-assigned patent applications:

Ser. No. 09/722,410 filed Nov. 28, 2000 entitled PORTABLE VIDEO GAME SYSTEM, which is a continuation-in-part of application Ser. No. 09/627,440, filed Jul. 28, 2000;

Ser. No. 09/723,322 filed Nov. 28, 2000 entitled SOFTWARE IMPLEMENTATION OF A HANDHELD VIDEO GAME HARDWARE PLATFORM; and Ser. No. 09/321,201 of Okada et al filed May 27, 1999 entitled "Portable Color Display Game Machine and Storage Medium for The Same".

Each of these related applications is incorporated herein by reference.

STATEMENT REGARDING FEDERALLY SPONSORED RESEARCH OR DEVELOPMENT

Not applicable.

FIELD OF THE INVENTION

This invention relates to delivering video game entertainment over a network, and more particular, to allowing passengers on airplanes, trains, and cruise ships to play video games via a network-based distribution system. Still more particularly, the invention relates to the use of a generic computing network for downloading video game platform emulators and associated video games for interpretation by such emulators.

BACKGROUND AND SUMMARY OF THE INVENTION

There are advantages to be gained by delivering entertainment services to airline passengers, passengers aboard trains and cruise ships, and hotel guests. Passengers onboard airplanes and trains often have to spend many hours in their seats with little or nothing to do. Hotels and cruise ships tend to offer more activities, but guests often have a difficult time trying to entertain their children (and sometimes themselves)—especially in the evenings and early mornings when most hotel services are closed. Hotels, airlines, train operators and cruise ship operators have long understood that having a relatively captive audience provides a number of business opportunities but also imposes responsibilities to provide their guests with entertainment and amenities to keep them occupied and happy.

Several decades ago, airlines began providing in flight entertainment such as movies, television reruns and news. The airlines have found that their customers are happier when they are kept occupied and interested during long flights. By creating a more satisfying in-flight experience, passengers are happier and less likely to be irritable or cause problems. By providing such in-flight entertainment to their passengers, the airlines receive several benefits and their passengers have also significantly benefited.

As technology has advanced, increasingly more powerful computing devices are now able to be cost-effectively installed within smaller and smaller packages. This has allowed some airlines to deploy relatively sophisticated seat-back controllers and display units within the seat backs and/or armrests of newer jet airplanes. Many transcontinental aircraft now have color liquid crystal displays at each passenger seat. These individual seat-back or arm-rest displays can allow each passenger to have an individual choice of several different movies or other entertainment programs.

To take advantage of such individual color displays on airlines, trains and other environments, Nintendo some time ago launched a series of product offerings that allowed people to play video games. Details of such arrangements may be found, for example, in U.S. Pat. No. 5,581,270 to Smith et al and U.S. Pat. No. 5,959,596 to McCarten et al. These arrangements have been successful, but further improvements are possible.

One area of possible improvement relates to the ability to do without specialized game playing hardware while nevertheless offering people a full range of interesting video game experiences over a more generic network. Airlines, cruise ships, hotels, trains, cable operators, satellite television operators, and the like may be reluctant to deploy specialized video game playing hardware components. Rather, they may be interested in providing a general-purpose infrastructure that enables a wide range of different applications—e.g., everything from stock market trading to web surfing to mass media displays including but not limited to playing video games. While a prior approach has been to use specialized video game playing hardware technology to provide a wider range of applications beyond video games, there are potential problems with reliability and cost that makes it attractive in some environments to install a purely generic networked computing environment, and to adapt that network by using software for playing video games.

As the computing power of airline seat back controllers, set top boxes and other more general purpose equipment has increased, we have found that it is now possible to develop a video game playing network that is based on emulating special-purpose video game playing platforms using software running on more general-purpose networked computing platforms.

As one particular example, Nintendo's GAME BOY® hand-held video game platforms have been extraordinarily successful. Nintendo released the first GAME BOY® in the late 1980s. Since then, this product and its successors (GAME BOY COLOR® and GAME BOY ADVANCE®) have captured the imaginations of millions of video game players throughout the world. A wide number of different software applications (including but not limited to video games) have been designed to run on these platforms. People throughout the world enjoy these applications every day. One can see them being used on subways, at sports arenas, after school, and in a number of other contexts. See FIG. 1A.

Nintendo's GAME BOY®, GAME BOY COLOR® and GAME BOY ADVANCE® are examples of platforms having specialized hardware that is optimized for low cost, excellent performance and good graphics. These devices are not really general purpose computers; rather, they are special-purpose devices with specialized capabilities particularly adapted to video game play. These special capabilities provide low cost and exciting video game play action with good graphics and sound.

While GAME BOY® platforms are inexpensive and have long battery life, there may be situations (as described above) in which it would be desirable to play or use applications developed for GAME BOY® on other, more general purpose platforms. For example, an airline, train or other vehicle passenger might want to play video games during a long journey. As shown in FIG. 1B, airlines are installing general purpose computer-based seat-back computer displays into the backs of airline seats and/or into armrests of airline seats. Trains, buses and other mass transport vehicles are expected to do the same. Such seat-back/armrest displays may provide a low cost personal computer including a processor, random access memory, liquid crystal display and input device(s). Similar displays could be installed in other vehicles (e.g., ships, vans, cars, etc.) or in other contexts (e.g., at walk-up kiosks, within hotel rooms, etc.). It would be desirable under certain circumstances to allow users to execute all sorts of different applications including GAME BOY® video games and other applications using the general-purpose computer capabilities of such seat-back or similar display devices.

Personal computers have also proliferated throughout the world and are now available at relatively low cost. A trend has shifted some entertainment from the home television set to the home personal computer, where children and adults can view interesting web pages and play downloaded video games and other applications. In some circumstances, it may be desirable to allow users to play GAME BOY® video games on their home personal computers (see FIG. 1C).

A wide variety of so-called personal digital assistants (PDA's) and "pocket PCs" have become available in recent years. Such devices now comprise an entire miniature computer within a package small enough to fit into your pocket. Mobile cellular telephones are also becoming increasingly computationally-intensive and have better displays so they can access the World Wide Web and perform a variety of downloaded applications. Similarly, there are now satellite television receivers, cable set top boxes, and other general purpose computing-capable devices deployed throughout the U.S. In some circumstances, it may be desirable to enable people to play GAME BOY® video games and other GAME BOY® applications on a personal digital assistant, cellular telephone, set top boxes or other such devices (see FIG. 1D).

The special-purpose sound and graphics circuitry provided by the GAME BOY® platforms is not generally found in the various other platforms shown in FIGS. 1B, 1C and 1D. Providing these missing capabilities is one of the challenges to running a GAME BOY® video game (or other GAME BOY® application) on these other target platforms.

Another challenge relates to instruction set compatibility. Nintendo's GAME BOY® platform is based on an older, relatively inexpensive microprocessor (the Zilog Z80) that is no longer being used in most modern general purpose computer systems such as personal computers, seat-back displays, set top boxes, and personal digital assistants. The Z80 instruction set (the language in which all GAME BOY® games and other GAME BOY® applications are written in) is not directly understood by the more modern Intel microprocessors (e.g., the 8086, 80286, 80386, Pentium and other processors in the Intel family) that are now widely used and found in most personal computers, seat-back displays, personal digital assistants, and the like. We have found that it is possible to "port" certain GAME BOY® games or other applications to different microprocessor families (e.g., by cross-compiling the source code to a different target microprocessor). Also, there is an advantage in certain contexts to being able to play or execute the same binary images stored in GAME BOY® cartridges on target platforms other than GAME BOY®.

One way to provide a cross-platform capability is to provide a GAME BOY® software emulator on the target platform. Generally, a software emulator is a computer program that executes on a desired target platform (e.g., a seat-back display device, a personal computer or a personal digital assistant shown in FIGS. 1B–1D) and uses software to supply native platform capabilities that are missing from the target platform. For example, a software emulator may perform some or all of GAME BOY®'s specialized graphics functions in software, and may interface with whatever graphics resources are available on the target platform to display resulting images. A software emulator may translate or interpret Z80 instructions so the microprocessor of the target platform can perform the functions that GAME BOY® would perform if presented with the same instructions. The software emulator may include software code that emulates hardware capabilities within the GAME BOY® circuitry (e.g., audio and/or graphics processing) and/or translate associated GAME BOY® application requests into requests that can be handled by the hardware resources available on the target platform. For example, the target platform may include a graphics adapter and associated display that is incompatible with GAME BOY®'s graphics hardware but which can perform some of the basic graphics functions required to display GAME BOY® graphics on a display.

A number of video game emulators have been written for a variety of different platforms ranging from personal digital assistants to personal computers. However, these have not been adapted to airlines, hotels and other such environments. Therefore, further improvements are possible and desirable.

The present invention solves these and other problems by providing a unique software emulator-based networked video game playing system capable of providing acceptable speed performance and good image and sound quality on even a low-capability target platform such as a seat back display or set top box for example. The preferred embodiment software emulator provided by this invention maintains high-quality graphics and sound in real time across a wide variety of video games and other applications—and nearly duplicates the graphics and sound that would be experienced by a user of the GAME BOY®, GAME BOY COLOR® and/or GAME BOY ADVANCE® platform running the same game or other application.

In accordance with one aspect of an example illustrative embodiment, a software emulator is provided for a seat-back in-flight (or in-cruise, or in-room) computer entertainment system that controls the entertainment system to emulate a portable handheld (or other) game system. The emulation software may provide a number of capabilities that ensure an interesting and authentic game playing experience. The following are example features provided in accordance with aspects of the present invention:

adequate frame rate to provide authentic, enjoyable game play experiences, color palette emulation at run time so as to reasonable represent original game colors, adequate display resolution consistent with original handheld game play platform, synchronized sound and video, realistic emulated sound that reasonably represents original game sound, emulated authentication and logo screen display, interactive real time response to user-manipulated controls, for airline use, automatic game play pause, automatic decryption of encrypted executables, on-the-fly interpreted code replacement to replace certain instructions with other instructions or blocks of instructions based on a pre-defined scripting language or other mechanism, for-engine software architecture including a core microprocessor emulation engine, a memory manager, a video manager and a sound emulator, real time synchronization to game play events such as interrupts, simulation of original platform memory including video memory image storage, on-the-fly changing of VGA color palette to match original platform colors, emulation of original platform memory paging, real time sound synthesis in synchronization with game play, and other advantageous features.

The preferred embodiment emulator achieves this through a unique combination of features and optimizations including, for example:

use of a virtual liquid crystal display controller (state machine) to maintain real time synchronization with events as they would occur on the native platform, use of a hardware-assisted bit BLIT memory transfer operation to efficiently transfer graphics information into video memory, pre-computed translation table for translating native platform graphics character formats into formats more compatible with standard graphics adapters, emulation of native platform color palette information to provide compatibility with games and other applications that change color palettes within a frame, emulation of major registers and other hardware-based memory structures within the native platform in RAM under software control, use of a jump table to efficiently parse incoming binary instruction formats, use of a unique page table to control memory access by remapping memory access instructions into different memory locations and/or function calls, availability of a ROM protection function to eliminate ROM overwriting during emulated operations, responsive to video game compatibility modes and registration data, models native platform using state machine defining search, transfer, horizontal blank and vertical blank states, cycle counter to determine when a modeled state has expired and transition to a new state is desired, selective frame display update skipping while maintaining execution of all instructions to maintain state information while minimizing game play slowdowns, optional NOP loop look ahead feature to avoid wasting processing time in NOP loops, redundant emulated RAM and ROM storage to optimize execution efficiency, separate page tables for read and write operations, modeling of native microprocessor registers as a union of byte, word and long register formats, modeling native instruction CPU flags to allow efficient updating after operations are performed by target platform microprocessor, mapping emulated program counter into target platform microprocessor general purpose register, reads and writes via index register go through pointer tables to increase execution efficiency, adaptable input controller emulator to provide user inputs from a variety of different user input devices, emulated object attribute memory, and use of screen memory buffers larger than screen size to increase paging efficiency by eliminating clipping calculations and using the hardware BitBlt to transfer a subset of the memory buffer to displayed video memory.

BRIEF DESCRIPTION OF THE DRAWINGS

These and other features and advantages provided by the invention will be better and more completely understood by referring to the following detailed description of presently preferred illustrative but non-limiting embodiments in conjunction with the drawings, of which:

FIGS. 2B–2I show exemplary and illustrative screen displays;

FIG. 2L shows example emulator timer tables;

FIG. 2M shows an example, illustrative general purpose computing device block diagram;

FIG. 2O shows an example illustrative more detailed software emulator architecture;

FIG. 6 shows example compatibility modes;

FIG. 7 shows example registration data locations;

FIGS. 9A–9B show example virtual LCD controller emulation/control registers;

FIG. 9C shows example state machine cycle parameters;

FIG. 15 shows example read and write pointer tables;

FIGS. 19A and 19B show example additional emulator control registers;

FIG. 28 shows example VGA mode control parameters; and

FIG. 29 shows example graphics engine register indices.

DETAILED DESCRIPTION OF PRESENTLY PREFERRED EXAMPLE EMBODIMENTS

Figure 1A:
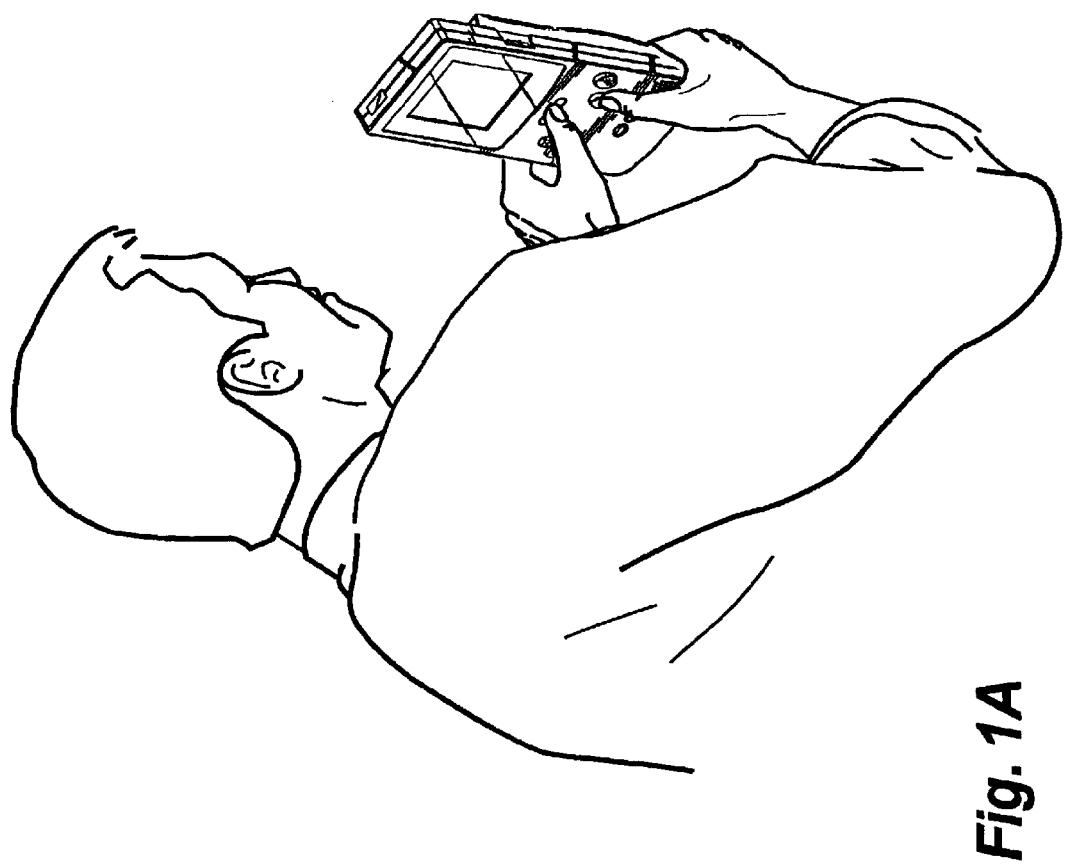
FIG. 1A shows someone playing a Nintendo GAME BOY® portable video game platform.
Figure 1B:
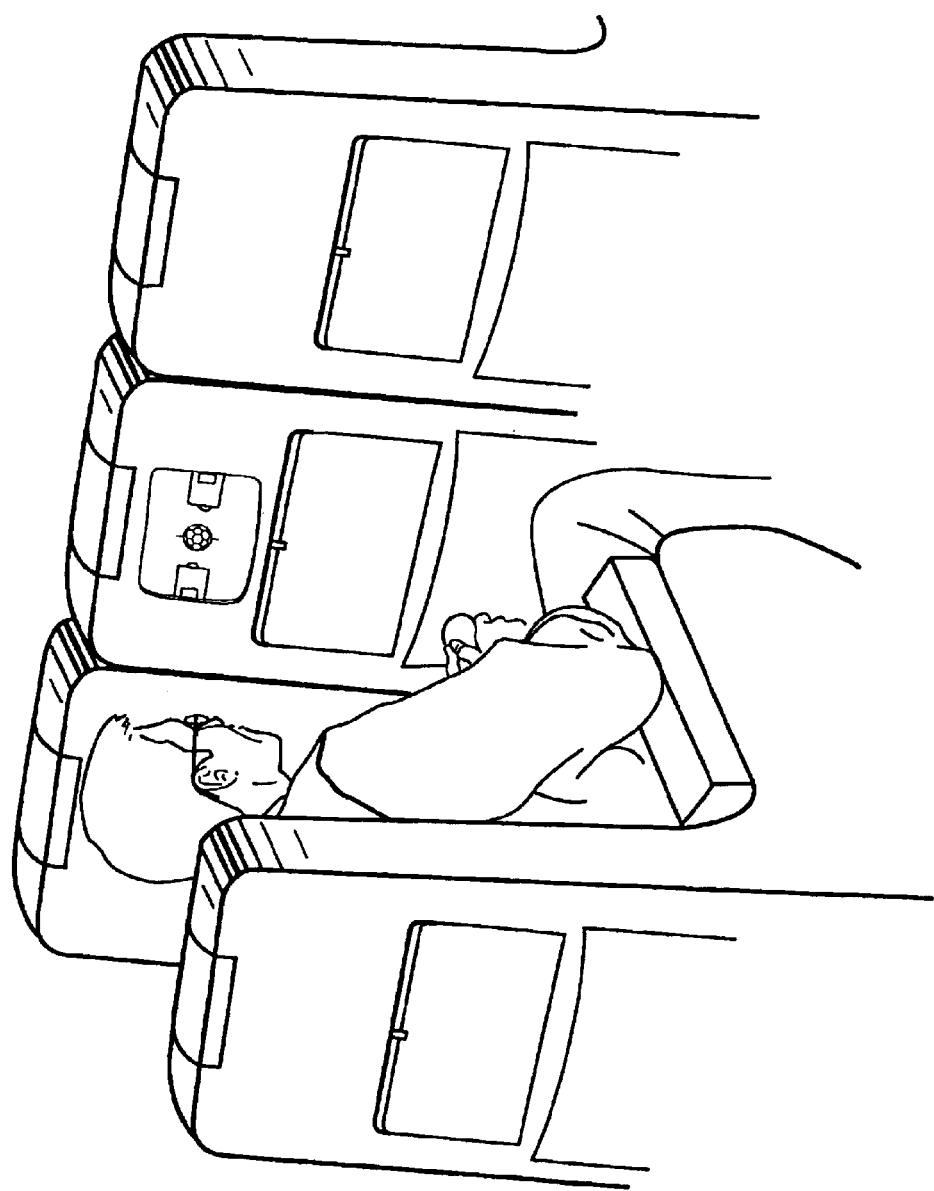
FIGS. 1B–1D show some illustrative but non-limiting example target platforms that could be used to emulate the FIG. 1 GAME BOY®.
Figure 1C:
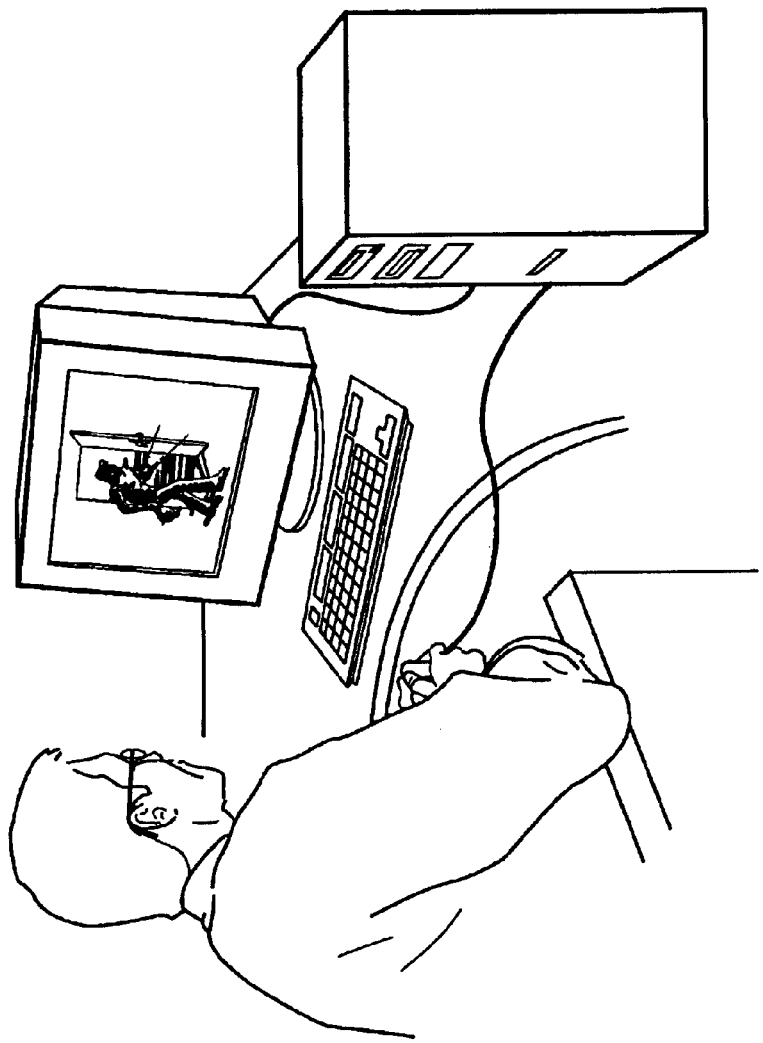
Figure 1D:
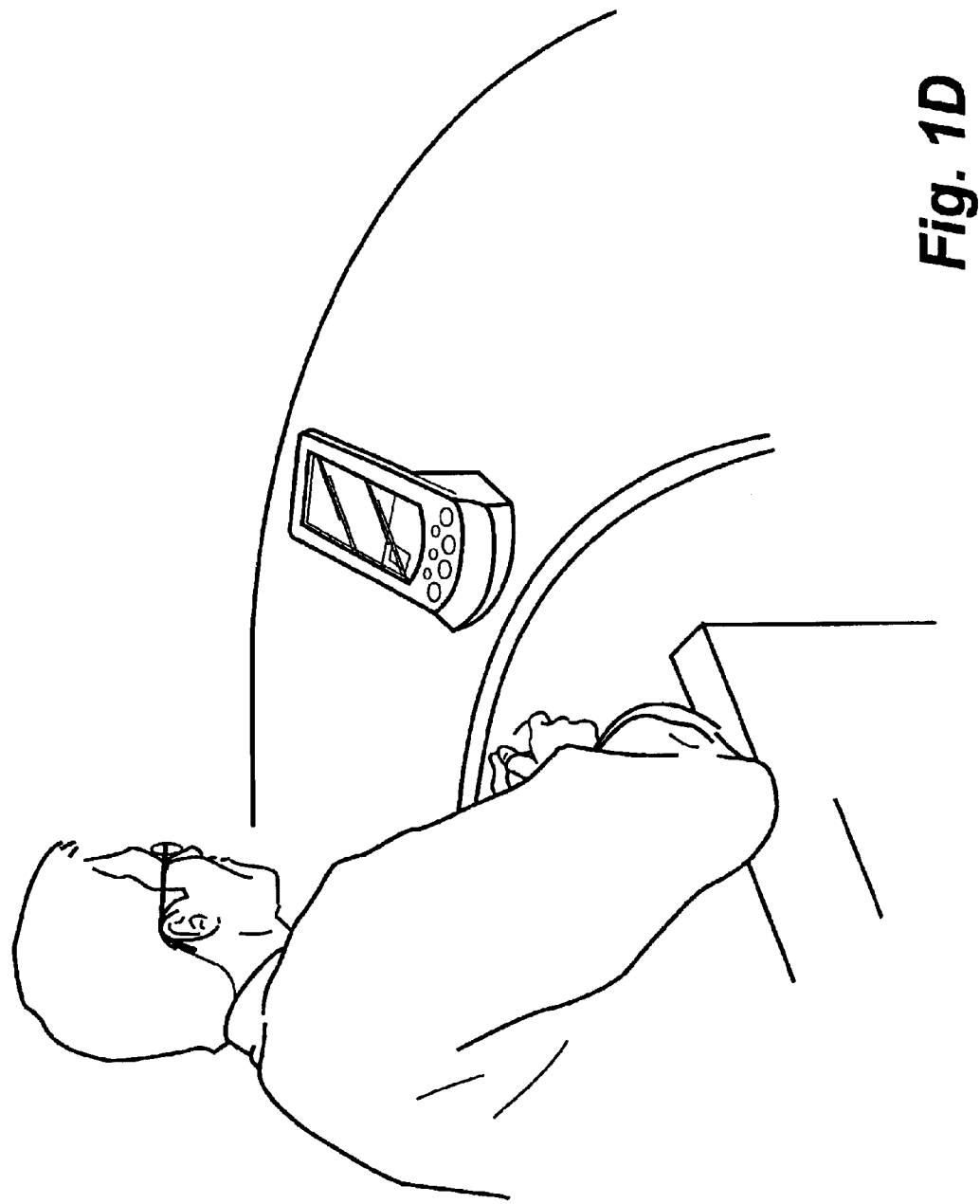
Figure 2:
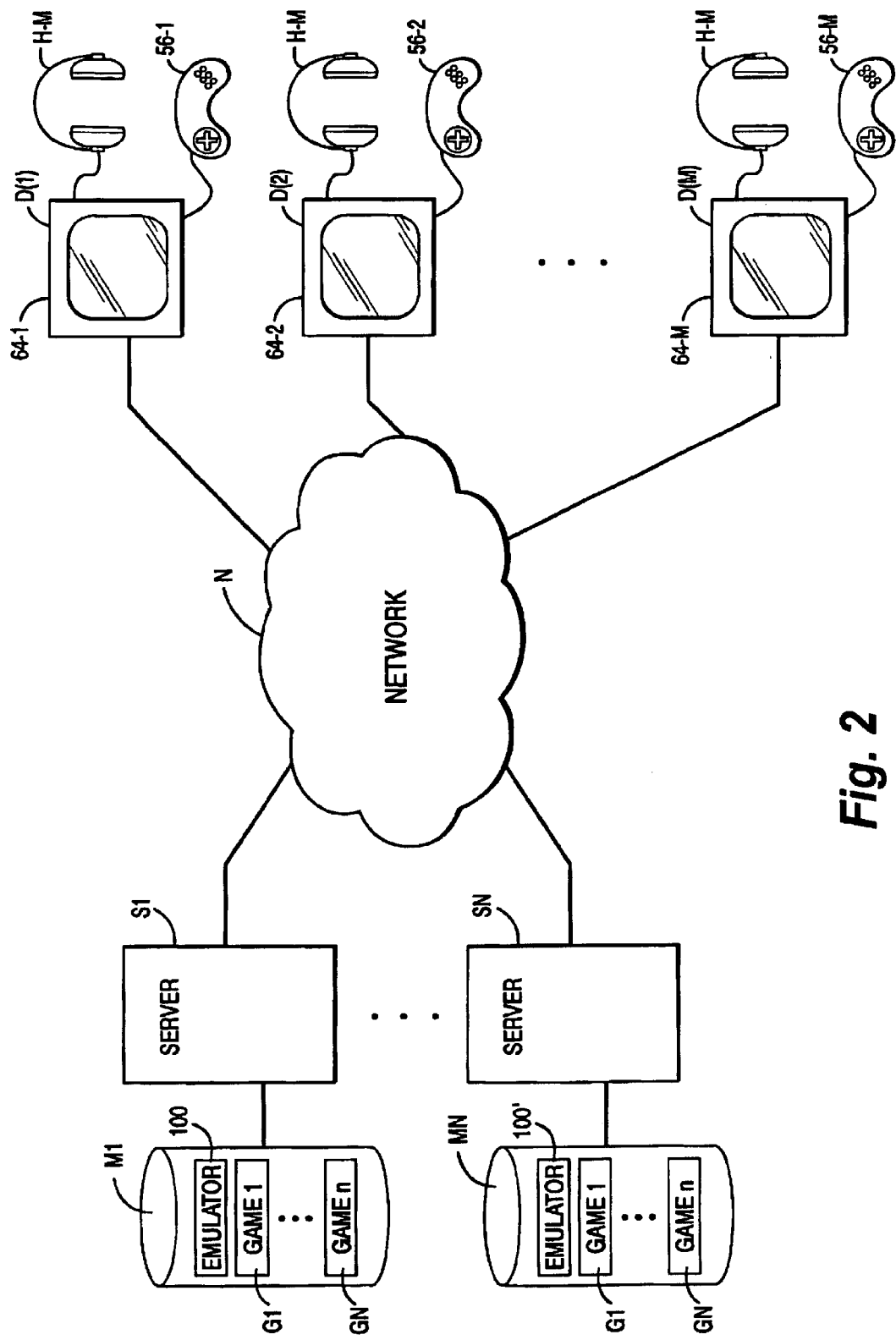
FIG. 2 is a block diagram of an example preferred illustrative embodiment video game playing network.

FIG. 2 shows an example exemplary video game play delivery network including one or more servers S1 . . . SN coupled by a network "cloud" N to one or a number of display devices D1, . . . , DM. Network N may comprise any conventional network such as for example, an Ethernet-based local area network, a wide area network, the Internet, a telephone network, a cable television network, a wireless network, a satellite network, or any other convenient network arrangement that permits display devices D to communicate with server(s) S.

Servers S may in one particular embodiment comprise conventional file servers, but in other embodiments could comprise web servers, cable television head ends, wireless computing device servers, satellites, or any other convenient server architecture.

Devices D in the preferred illustrative embodiment comprise any sort of general or special purpose device with some computing capability and including a display, a user input device and preferably also a sound reproduction capability, for example:

an airline, train, bus, car, van or cruise ship seat back or armrest based controller;
a cable television set top box;
a satellite television receiver;
a wired or wireless personal digital assistant, handheld computer or pocket PC;
a personal computer;
a video game playing platform;
a microprocessor-based television set or other consumer appliance;
a hotel or cruise ship based television or other display;
any other special or general purpose display device.

In the example embodiment, devices D may each include, for example, a display device 64 such as, for example, a black and white or color liquid crystal display, a CRT, or any other convenient display. In the example and illustrative embodiment, devices D may also include preferably some ability to reproduce sound (e.g., audio amplifiers and associated headphones H or loudspeakers). In the exemplary and illustrative embodiment, devices D may each include a user input device 56 that allows users to interact with the device D in order to play interactive video games. As one example, user input device 56 may have a configuration shown in FIG. 2H, and may be a multi-purpose device that provides both the telephone capability and a general-purpose control interface including special-purpose video game controls. In other exemplary configurations, user input device 56 may provide any convenient means for inputting user interactions to device D including, for example, keyboards, wireless television controllers, the controls on personal digital assistants, or the like.

In the example illustrative embodiment, servers S have mass storage devices M associated therewith. Such mass storage devices M (e.g., magnetic hard drives, optical disks, etc.) store software emulators 100 that servers S can download onto devices D over network N for execution on devices D. Additionally, mass storage devices M may also store a library of games G that can be interpreted or otherwise "executed" by emulator 100 running on devices D.

In the example embodiment, emulator 100 and each of the game files G is assigned an individual part number that conforms with predetermined quality assurance procedures. Additionally, depending on the load process that the exemplary system is able to support, there may also be a need for a part number for individual load sets. Such part numbers will allow, for example, an airline to confirm what software is loaded onto an aircraft by using a conventional cabin maintenance terminal coupled to server(s) S.

In the example embodiment, the process of loading emulator 100 and game files G onto server(s) S conform with a conventional software loading process, with the main practical limit being the amount of free disk space on the mass storage device M of file server S. In practice, this may or may not be an issue depending upon the size of mass storage devices M. For airlines that have a compact disk optical drive fitted to their aircraft, the load process may be performed in a single software load with all the available games and the emulator 100 being loaded together. For airlines that do not use an optical disk drive, the load operation is preferably performed (i.e., in order to load the emulator 100 onto the mass storage device M of file server S) using a floppy disk (multiple floppy disks will probably have to be used). A complete load by floppy diskette may in some circumstances have the advantage of requiring only a single part number to cover the entire load and all of the available games are loaded at once allowing the airline flexibility. However, a disadvantage is that the load process may take considerably longer than if just the required games are loaded. To improve loading time, the disk loader may detect games already loaded and only extract and load new games if the target system provides this functionality. A partial load by floppy has the advantage that the load process will be quicker, but the disadvantage that individual part numbers may be required to cover each of the load disks (meaning an individual part number for the emulator 100 and for each of the games).

In the exemplary, illustrative embodiment, servers S also may provide and download a variety of other applications to devices D, such applications including but not limited to:
movies,
electronic books,
digital music,
multimedia presentations,
telephone and other communications applications,
stock quotes and trading,
Internet browsing,
electronic mail, games other than video games (e.g., text-based cross-word puzzles or the like),
electronic program guides, and
numerous other applications.

EXAMPLE GAME DOWNLOADS

Figure 2A:
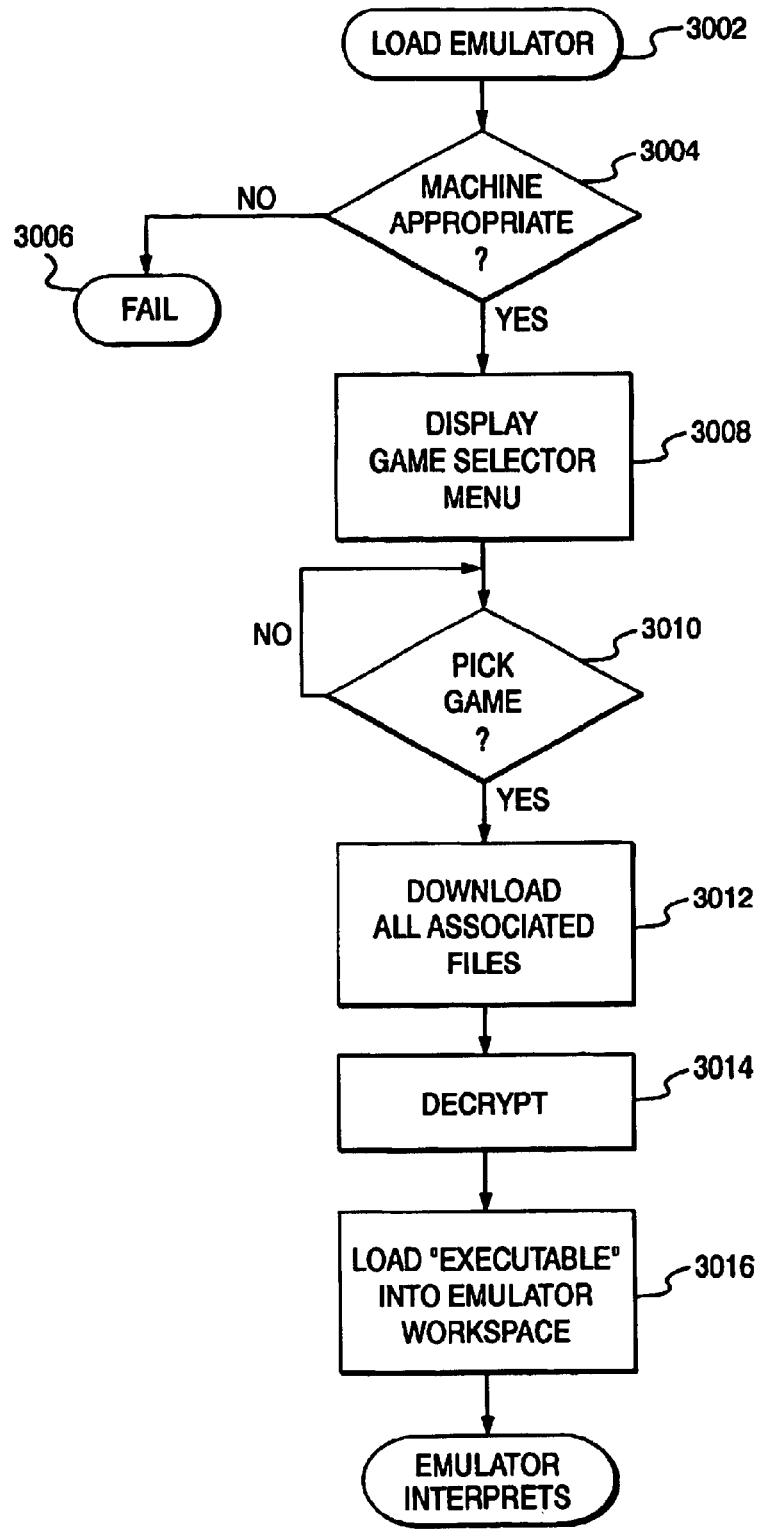
FIG. 2A shows an example overall main routine performed by the exemplary and illustrative system.
Figure 2B:
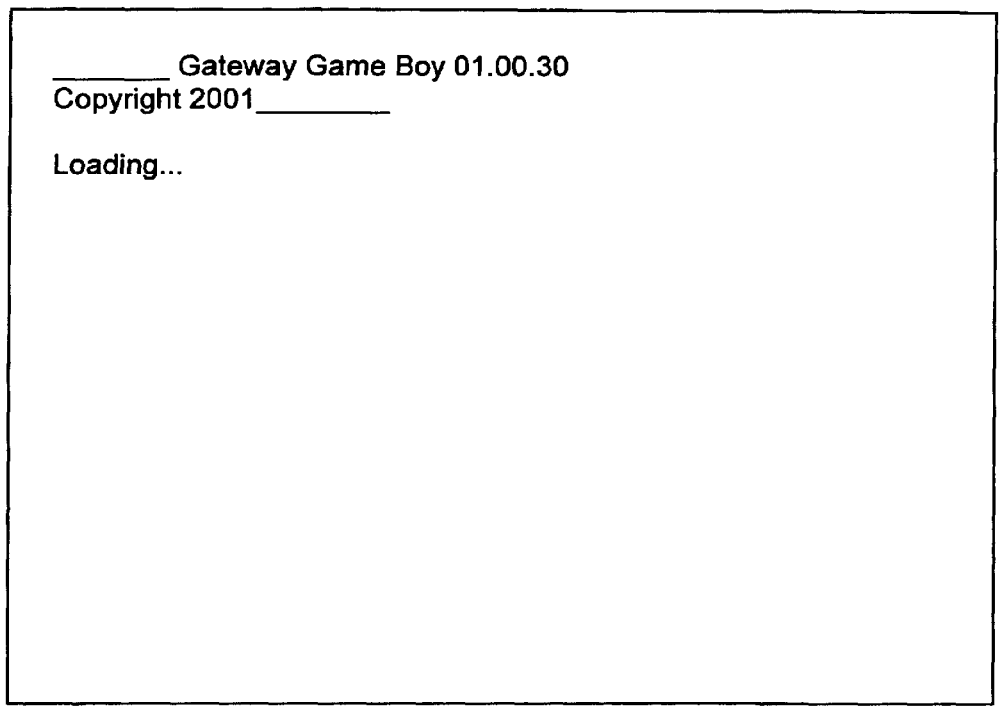
Figure 2C:
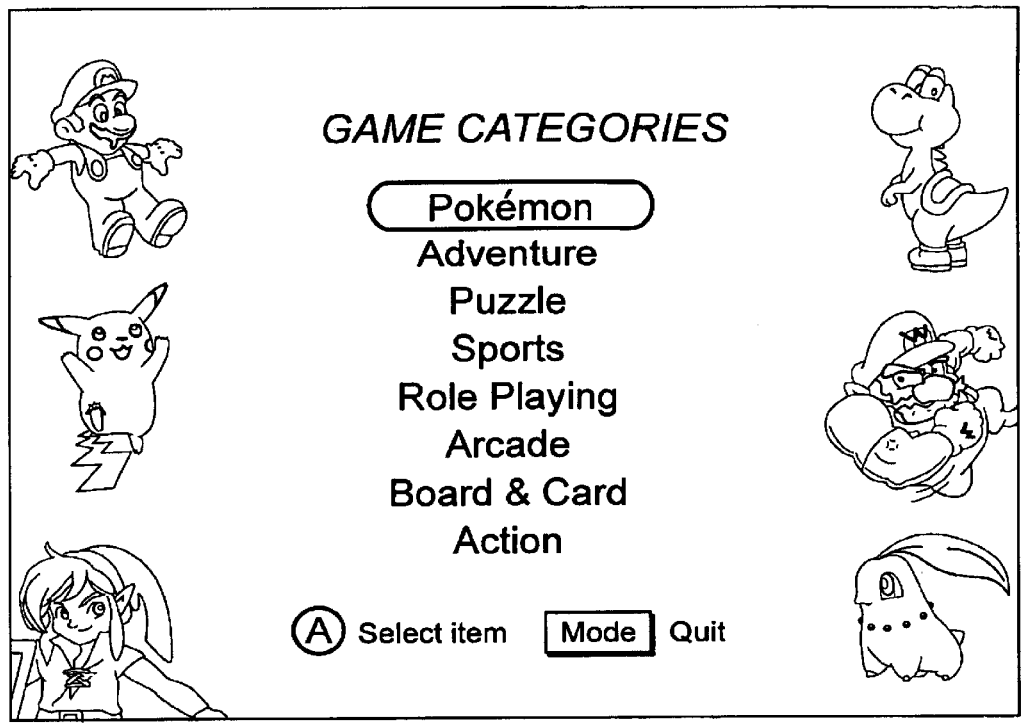
Figure 2D:
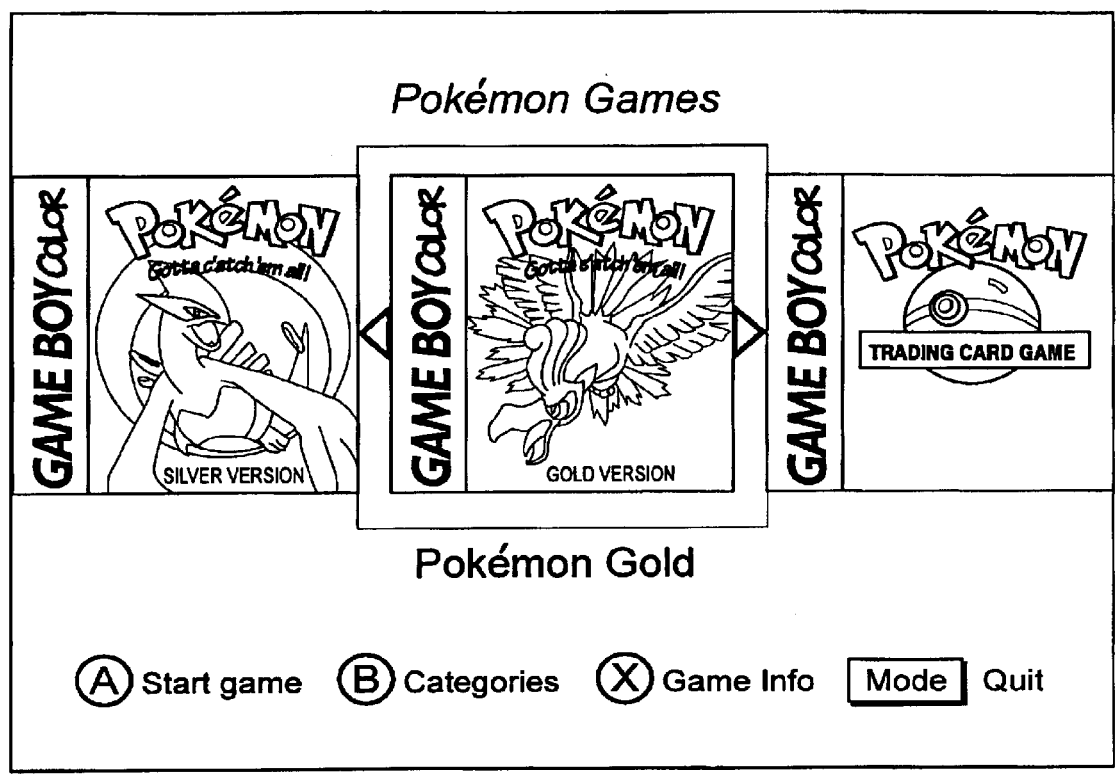
Figure 2E:
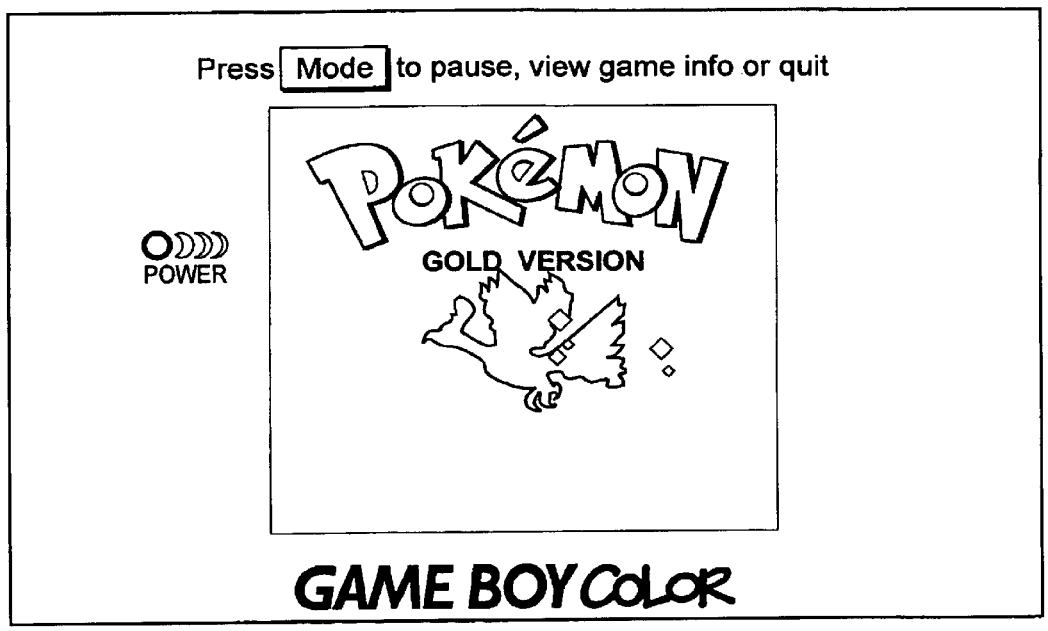
Figure 2F:
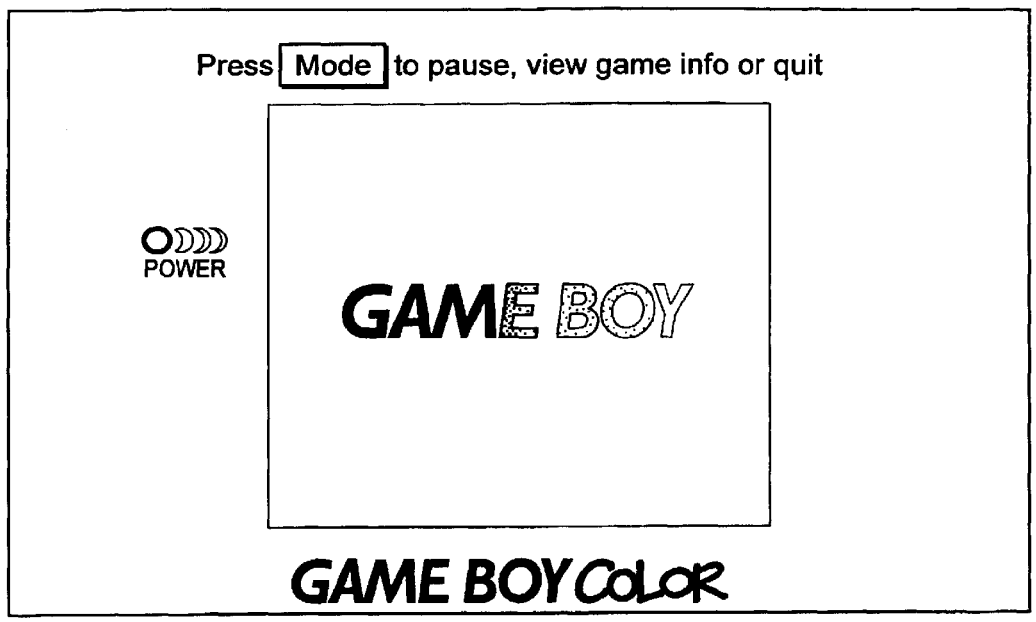

Loading of game and other application software may be provided via conventional mass storage device M via network N. FIG. 2A shows an illustrative flowchart of exemplary steps performed by a general purpose computing device D in the preferred embodiment, and FIGS. 2B–2I show exemplary corresponding screen displays.

Referring to FIG. 2A, device D typically upon power up will generally display a general menu providing a number of different selection options that may vary depending upon the particular application. For example, in a flight-based entertainment system, this main selector screen might display in-flight movies, stock trading, world wide web access, airplane position tracking, weather, and "play video games." Upon the user selecting the "play video games" option, the device D generates a request across network N to one of servers S requesting loading of emulator 100 (FIG. 2A, block 3002). In the exemplary embodiment, the emulator 100 authenticates the device D to ensure that the device D is appropriate for running the emulator (FIG. 2A, block 3004). In one exemplary embodiment, this authentication can be relatively unsophisticated, i.e., the emulator 100 is written for a specific hardware platform and will not run on any other hardware platform. However, in other embodiments, there may be positive authentication tests of various sorts (e.g., checking for the presence of appropriate machine codes, encrypted information, pass words, or the like) implemented to ensure that the device D is appropriate for running emulator 100.

If the device D is not appropriate ("no" exit to decision block 3004), the emulator 100 will fail and an error message may be generated (block 3006). Otherwise, the emulator 100 will begin loading ("yes" exit to decision block 3004). During this loading process, a "loading" informational screen (see FIG. 2B) may be displayed. The emulator 100 may then display a game selector menu (FIG. 2G, block 3008—see FIG. 2C for an example) allowing the user to choose a particular game or type of game to play. A number of nested menus may be displayed (e.g., see illustrative FIG. 2D) that allows the user to pick a particular game (see FIG. 2A, decision block 3010).

Once the user has selected a particular game to play (see FIG. 2E), the device D generates a request message across network N that requests a server S to download all files associated with that particular game (FIG. 2A, block 3012). In the example embodiment, this request may be in the form of a particular string (e.g., the name of a particular game). A small executable on server S may provide a lookup table that associates this particular game name with a list of one or a number of files (e.g., the "game ROM" binary image corresponding to the particular game code, and associated help file and any other auxiliary data files). These files are then downloaded by server S to the requesting device D upon request.

Figure 3:
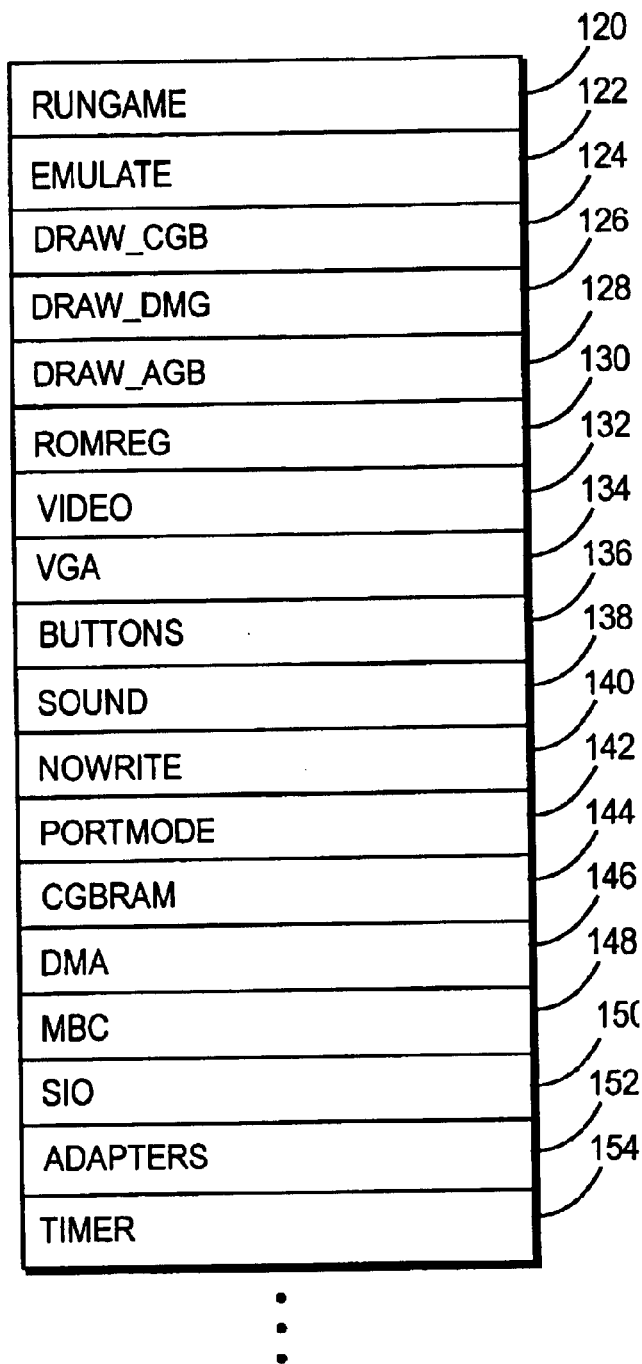
FIG. 3 is a block diagram of example functional models of the FIG. 2 emulator.

In the example embodiment, one or more of these files may be encrypted with some form of encryption. As an example, an initial portion of the game binary image may be encrypted using any conventional encryption mechanism. Upon downloading the game, the device D decrypts the file (block 3014), and loads the resulting binary image (and any other files associated therewith) into the work space of emulator 100 for interpretation (block 3016). If the initial part of the game is not successfully decrypted, the game will "crash" when emulator 100 tries to interpret it. A checksum check may also be used for both error correction and as a security measure. If a checksum test performed by emulator 100 fails, the emulator may refuse to execute the emulator. In one example embodiment, all executable binary files to be performed by the FIG. 3 emulator may be encrypted prior to distribution. The emulator may decrypt the instructions on-the-fly before executing them. The executable may be decrypted before executing it. In other arrangements, encryption may not be provided and the emulator may simply execute the binary ROM image without decrypting it first.

In one example embodiment, the emulator emulates the security system of the original platform. For example, a splash screen (see FIG. 2F) including certain information (e.g., "NINTENDO") may be displayed prior to game play. The code to display this screen is stored in each game or other application binary file. This code is compared to code in the master file located on a hard drive or within the emulator itself. Game play is allowed only if codes match. In another example, this security arrangement may be disabled to allow any compatible application to execute.

During the loading process, in the exemplary embodiment, an image of what a Nintendo GAME BOY COLOR looks like is displayed on the display 64 of device D (see FIG. 2E, 2F) for security reasons, and also in order to simulate as closely as possible that the user is playing on a real GAME BOY. This image of a GAME BOY is, in one illustrative embodiment, used to "frame" the game play in order to provide a more realistic game playing experience and also use the excess area of the display for constructive purpose (as opposed to simply blanking it out).

Figure 2H:
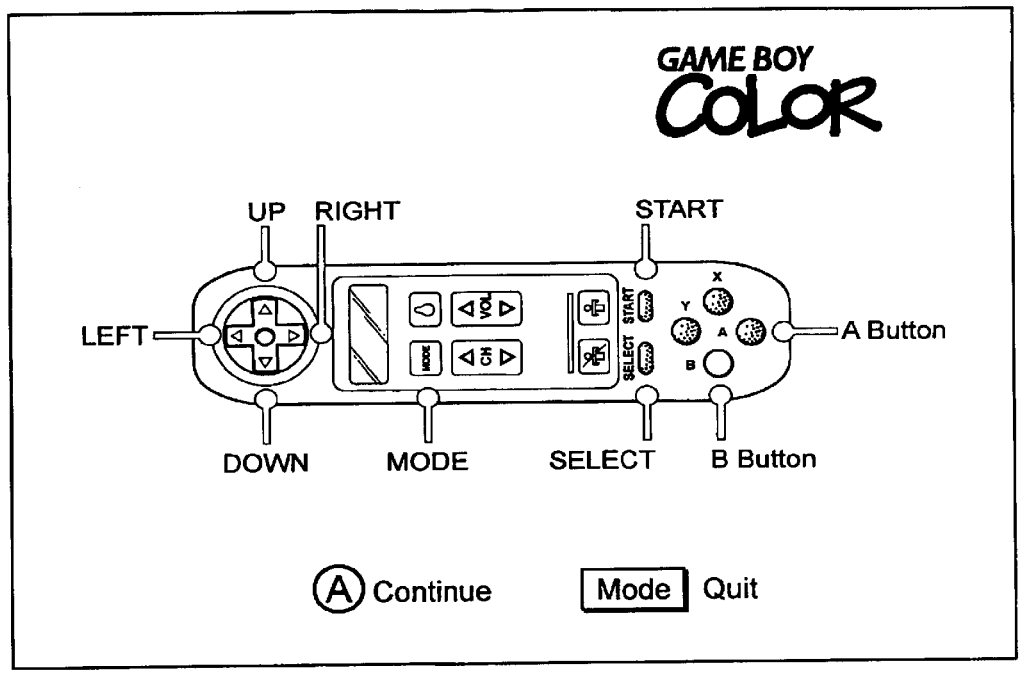

In the example embodiment, emulator 100 may also display a special "help" file contents customized for the play of the selected game on the device D in order to help the user understand the emulated user interface (see FIGS. 2G, 2H). Such help file contents can be provided in different languages (e.g., English, French, Japanese, German, Spanish, other) to accommodate different native speakers. Selecting a different language may be relatively straightforwardly accomplished by having server S send down a "help" file in a different language upon user request or selection of a "language" menu pick.

Figure 2I:
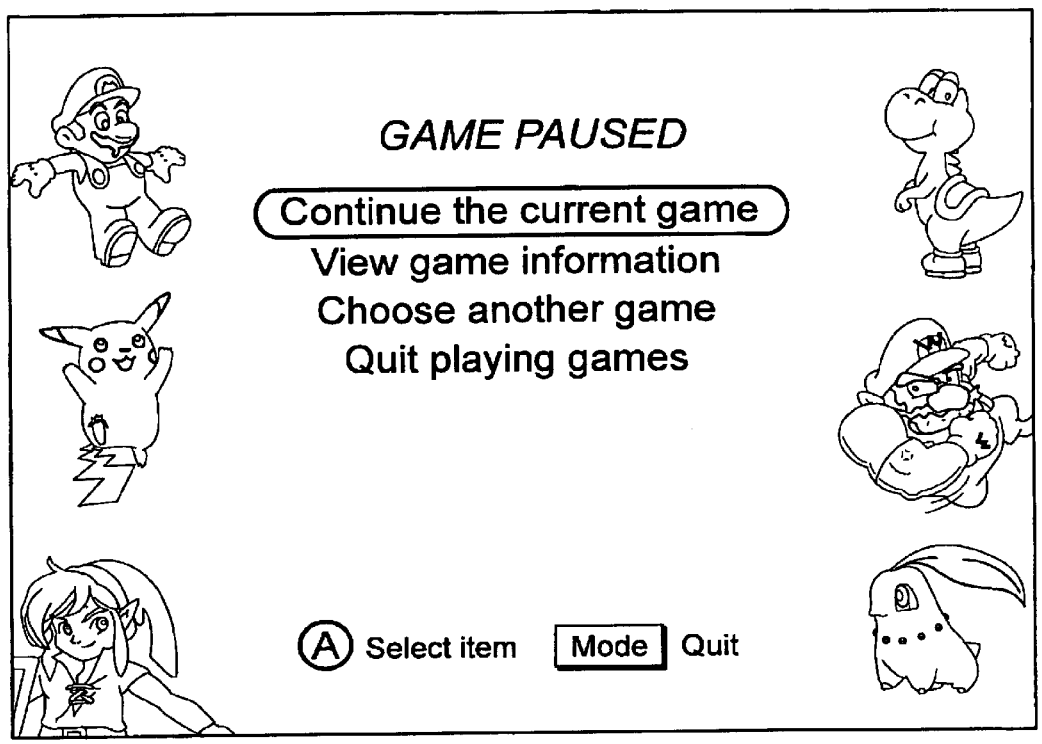

Additional control provided by preferred exemplary embodiment emulator 100 allows the user at any point to pause the game play (see FIG. 2I). Upon pausing game play, the user may choose to continue the current game, view game information, choose another game, or quit playing games (FIG. 2I). In some airline embodiments, game play may also be paused automatically in response to in flight announcements (e.g., when the pilot or crew speaks over the airplane intercom system). In particular, one use of the FIG. 2 system is to execute video games within a seat-back controller of an in flight airplane entertainment system. In such an arrangement, if there is a public address announcement (e.g., from the pilot) to the cabin, the emulator may institute a pause operation and display a message informing the passenger that the game is paused. Once the announcement has ended, the emulator may remain paused and display a message instructing a passenger to press any handset button to proceed. Game play may then resume from where the game was paused. In an exemplary embodiment for airline or other use, there may be a further control input provided by network N to devices D (e.g., via the same interface used for the user input device(s)) that provides a "halt" or "terminate" command. Upon receiving such a "halt" command, emulator 100 may exit and return control back to the operating system (if any).

The example emulator may need to be integrated with other applications and/or operating systems. To provide such integration, the emulator may be launched by an interactive menu application (e.g., with a specific game name). Such launching may be achieved by passing game name to the emulator on the command line. This may mean that the emulator needs to be shut down and restarted between selected games. Other embodiments may provide dynamic loading of games without a need to shut down the emulator between loads. In one example embodiment, emulator 100 provides a "watchdog" function of writing to a predetermined hardware register or other location within device D periodically in order to satisfy the device that an active application is running and that the application has not "crashed" or otherwise terminated abnormally. Different devices D may have different requirements.

The maximum game size the emulator may support is limited by a combination of physical memory of the new platform and the amount of memory used by the emulator itself. If there is available free memory, the emulator may support up to the maximum game size that the original platform supports. For example, the emulator may support at minimum 32 megabit games. Some original platform games use a memory management chip. The emulator in the example embodiment supports various versions of this memory management chip if adequate resources are available on the new platform.

Figure 2J:
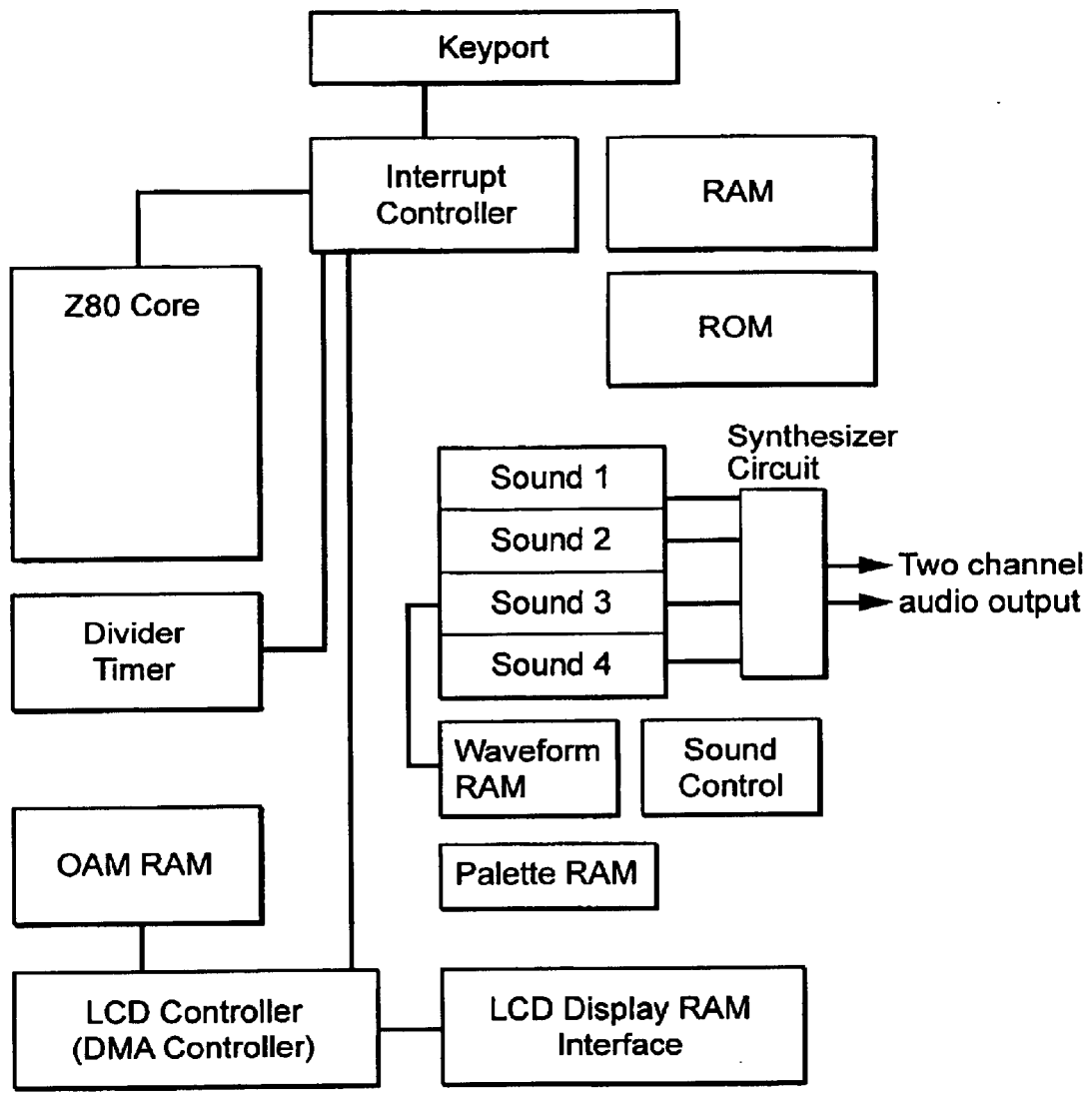
FIG. 2J shows an example emulator block diagram.
Figure 2K:
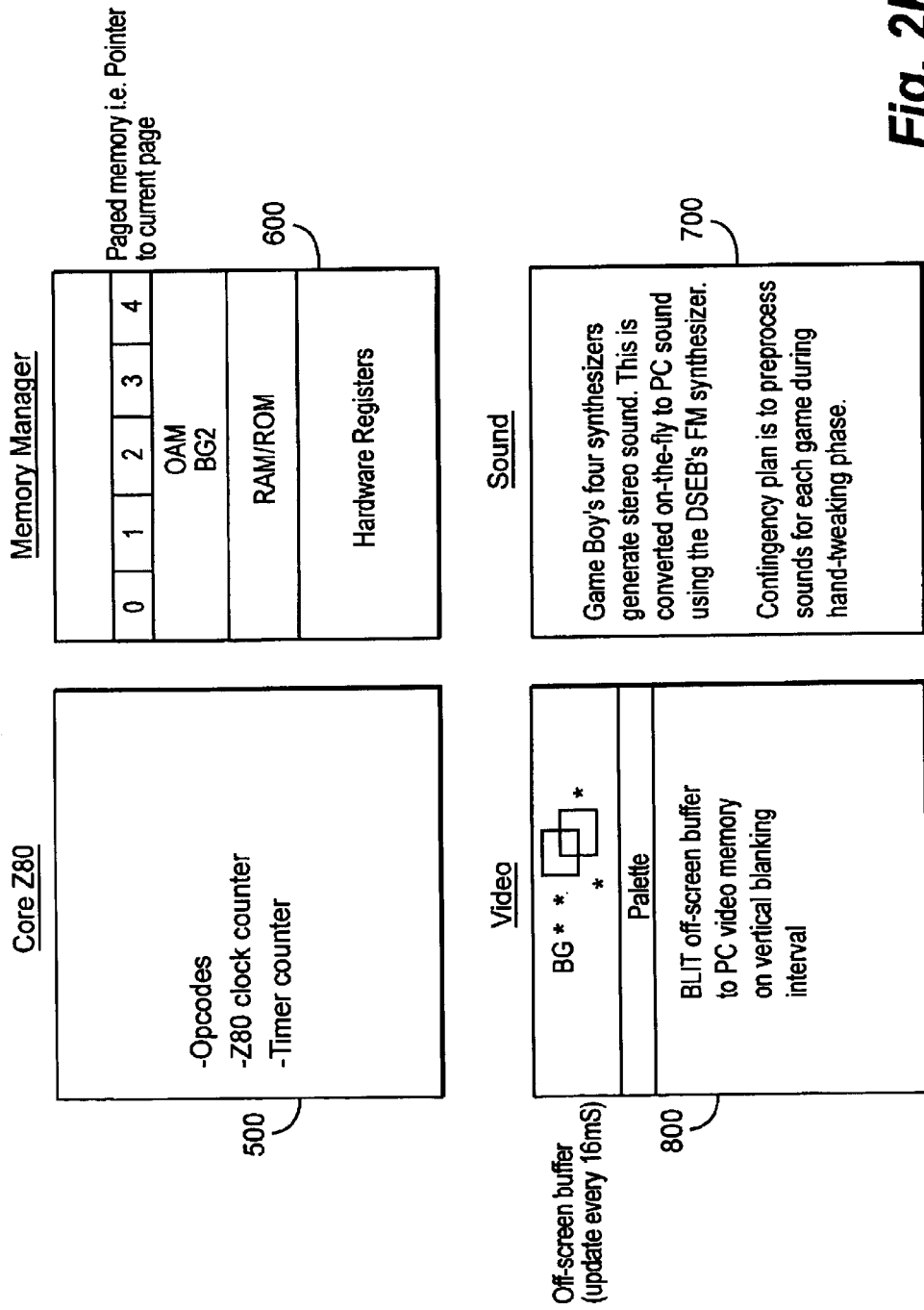
FIG. 2K shows an example emulator functional block diagram.

FIG. 2J shows an example software emulator architecture provided by an example embodiment of the present invention. The FIG. 2J emulator architecture includes four separate "engines" to handle the specific tasks and emulate the various structures of a real GAME BOY or other emulated video game platform. These separate engines include:

microprocessor core emulation engine 500, memory manager emulation engine 600, sound synthesizer emulation engine 700, and video emulation engine 800.

In the example embodiment, these various engines 500, 600, 700, 800 communicate with one another via C or x86 assembly function calls. Each engine 500, 600, 700, 800 is preferably implemented as a separate state machine using one or more virtual device drivers (VxD) to communicate with the input/output vectors and other structures of the platform executing the emulator.

EXAMPLE CORE MICROPROCESSOR EMULATION ENGINE 500

The main task performed by the core microprocessor emulation engine 500 in the example embodiment is to simulate/emulate instruction op codes. As described above, the original handheld video game platform microprocessor core comprises a Z80 microprocessor that executes the Z80 instruction set. However, the example platform on which emulator runs may use a completely different microprocessor (e.g., a 386 or 486 microprocessor or equivalent executing the x86 instruction set). Because video games and other applications written for the original platform are compiled into the Z80 instruction set that is incompatible with the Intel x86 instruction set, the example embodiment microprocessor emulation engine 500 simulates a Z80 microprocessor by interpreting the Z80 op codes and translating them appropriately into the new platform (e.g., x86) instruction set/op codes.

In some instances, the microprocessor emulation engine 500 may perform a single instruction corresponding to an instruction in the Z80 instruction set. In other situations, the microprocessor emulation engine 500 may need to perform multiple instructions to complete the task specified by a single Z80 instruction. There are also situations in which the microprocessor emulation engine 500 might be able to perform fewer instructions to accomplish the same result as a corresponding set of Z80 instructions.

In some instances, it may be desirable for microprocessor emulation engine 500 to selectively replace sections of game and emulator code for certain games. To accomplish this, the microprocessor emulation engine 500 may include an interface that examines a file (e.g., rplc.tcl) and replaces code according to a predefined scripting language (e.g., TCL or equivalent). For example, if it is desirable to replace a Z80 instruction "LD H, L" with a block of predefined code, the microprocessor emulation engine 500 during binary parsing may look for the file (e.g., rplc.tcl) for the target game. If the file exists, then the microprocessor emulation engine 500 may read the file and replace the code as specified in that file. For example, the emulator code for "LD H, L" might be replaced with any desired code from the file.

In addition to simulating Z80 op codes, the microprocessor emulation engine 500 in the example embodiment maintains three counters:

a Z80 clock counter: this counter allows the emulation engine 500 to synchronize with original platform events such as interrupts;

horizontal synchronization (line) counts: this counter increments every time a hsync should occur on the original platform to simulate display timing;

timer countdown: this time counts down a value past by the memory manager engine 600 for the smallest timer value.

The microprocessor emulation engine 500 must also simulate/emulate interrupts that would be generated on the original platform. In the example embodiment, the original platform has four different types of interrupts:

LCD display vertical blanking interrupts, status interrupts from liquid crystal display controller (four modes), timer overflow interrupt, serial transfer completion interrupt (not needed). This interrupt in the original platform indicates the end of input signal for serial ports P10–P3 (i.e., key presses).

In the example embodiment, all interrupts except the keyboard/controller are handled with countdown timers. An interrupt handler function is called when an appropriate count reaches 0. Detection of keyboard/controller data occurs in a conventional manner using an operating system in the personal computer serial port. Emulation engine 500 must yield to the operating system periodically to give the operating system the opportunity to detect serial port data and pass it to the memory manager engine 600.

EXAMPLE MEMORY MANAGER EMULATION ENGINE 600

The memory manager emulation engine 600 in the example embodiment simulates the original platform object attribute memory and creates video memory images in the new platform system memory (e.g., in an off-screen buffer). The example embodiment memory manager engine 600 maintains two off-screen buffers. Memory manager emulation engine 600 maintains a buffer pointer to point to the off-screen buffer representing the current display. Once a flag is set for one of the buffers, no data will be moved to that buffer and only read operations will occur. This frees the video engine 800 to BLIT the buffer to the new platform video memory for display. Once the second buffer is built with a full screen of display information, the buffer pointer is changed to point to this buffer and the off-screen buffer is then transferred to video memory by the video engine 800 during the next vertical blanking interval.

The moving object (OBJ) and background (BG) characters and pointers are maintained while monitoring and enforcing overlay rules.

A VGA color palette is maintained to match the colors of the original platform. This palette is changed on-the-fly as required. If such on-the-fly matching is inadequate to provide correct colors for particular games, then additional control information may be provided on a game-by-game basis and associated with particular games to supply the correct color information.

Figure 4:
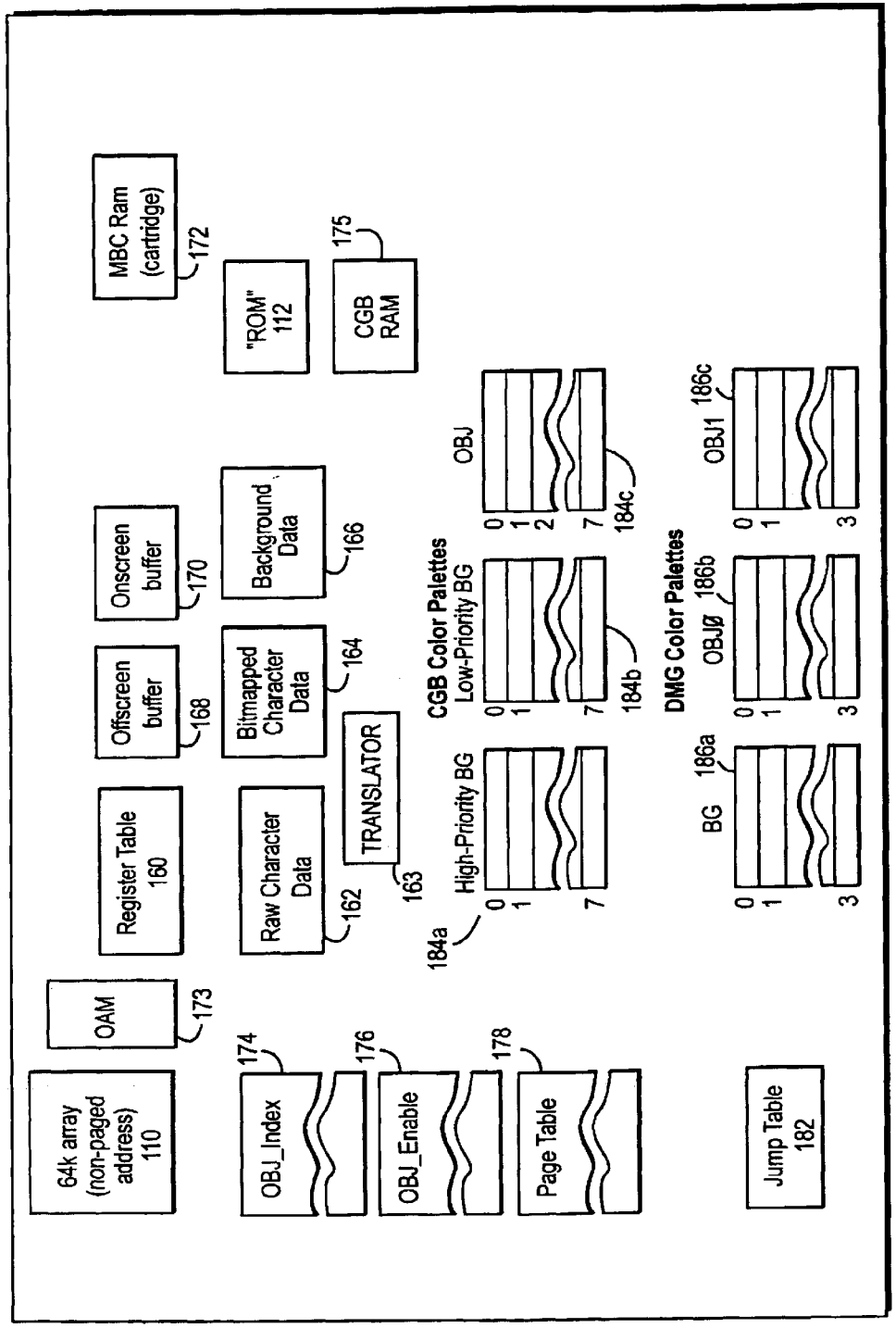
FIG. 4 is a block diagram of example emulator memory objects/data structures.
Figure 5:
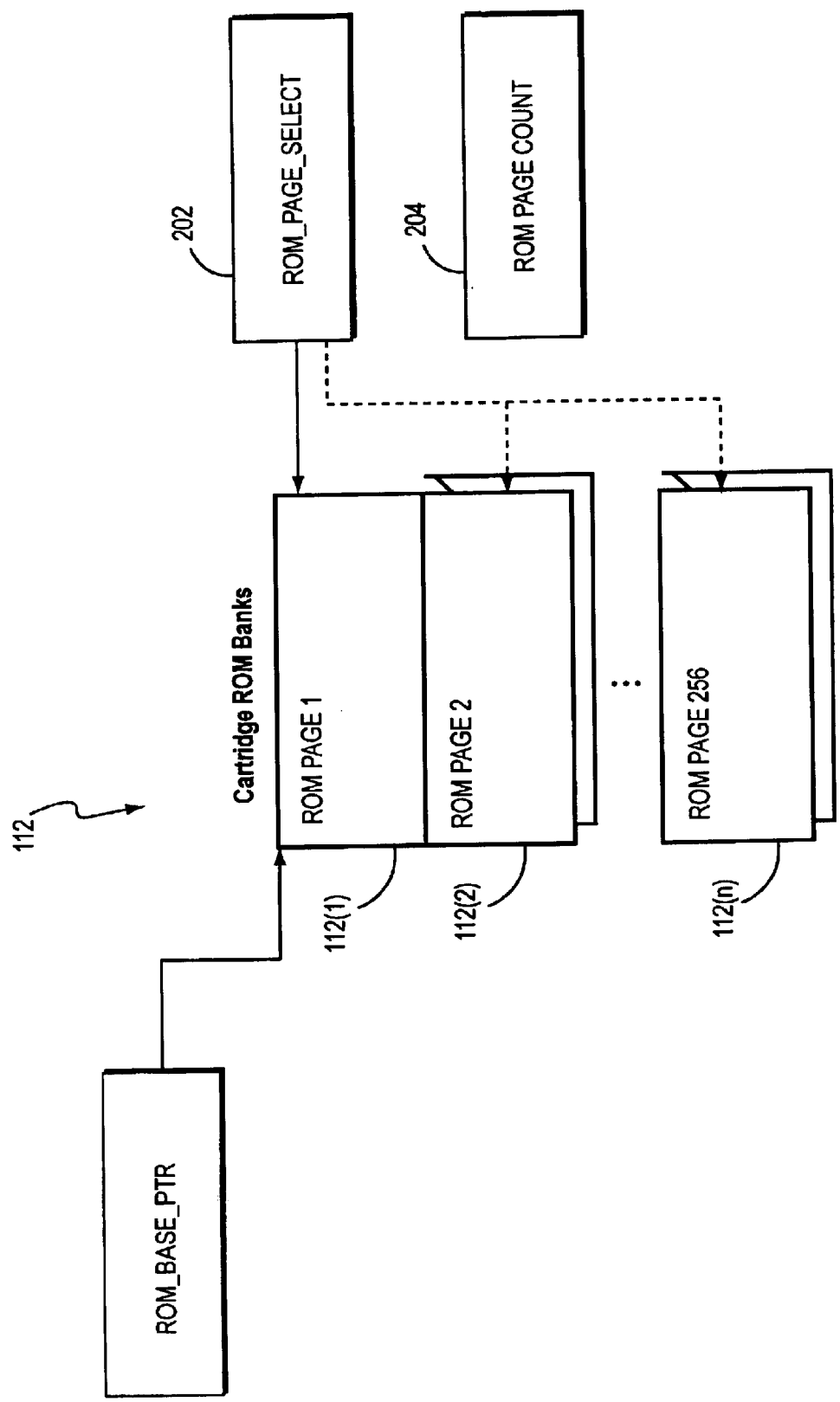
FIG. 5 shows an example emulated cartridge read only memory data structure.
Figure 8:
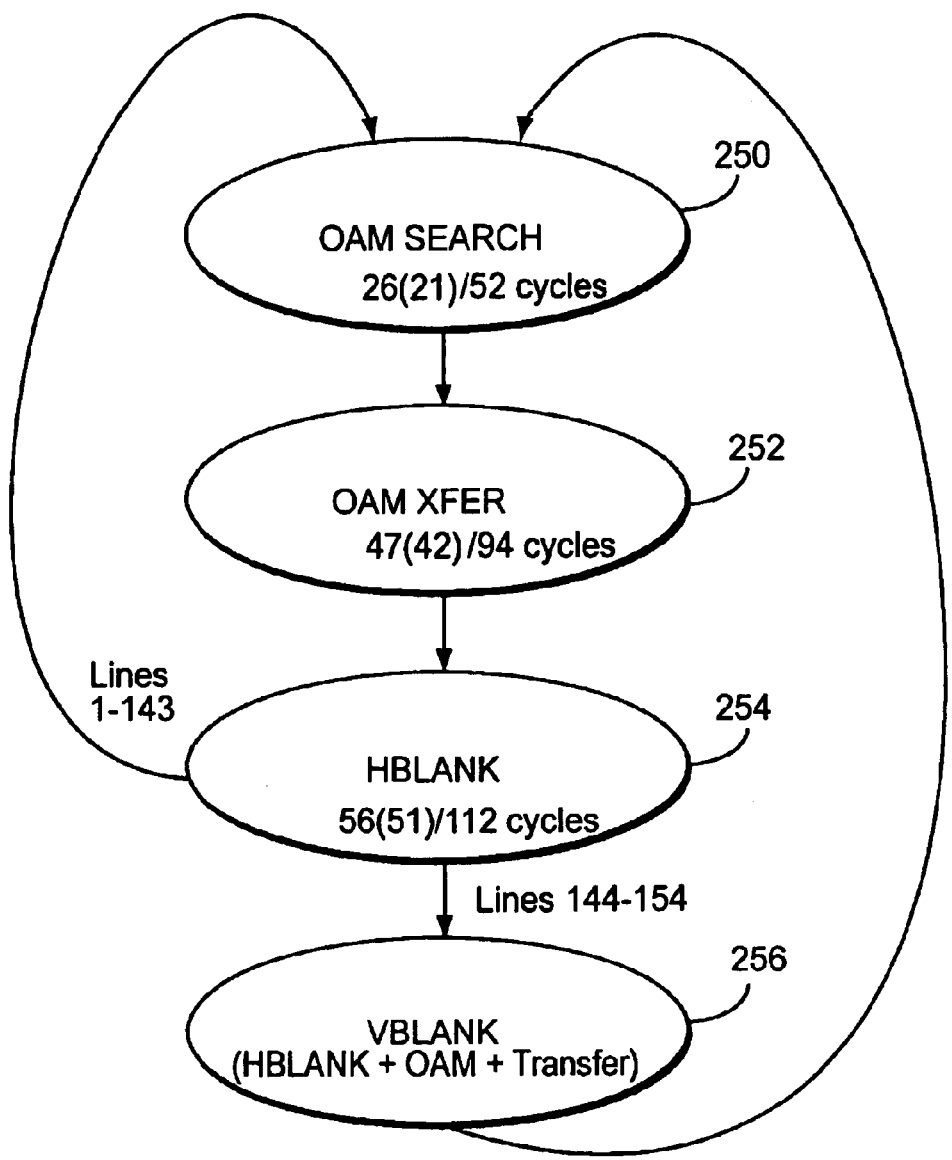
FIG. 8 shows an example virtual liquid crystal display controller state machine state diagram.
Figure 9A:
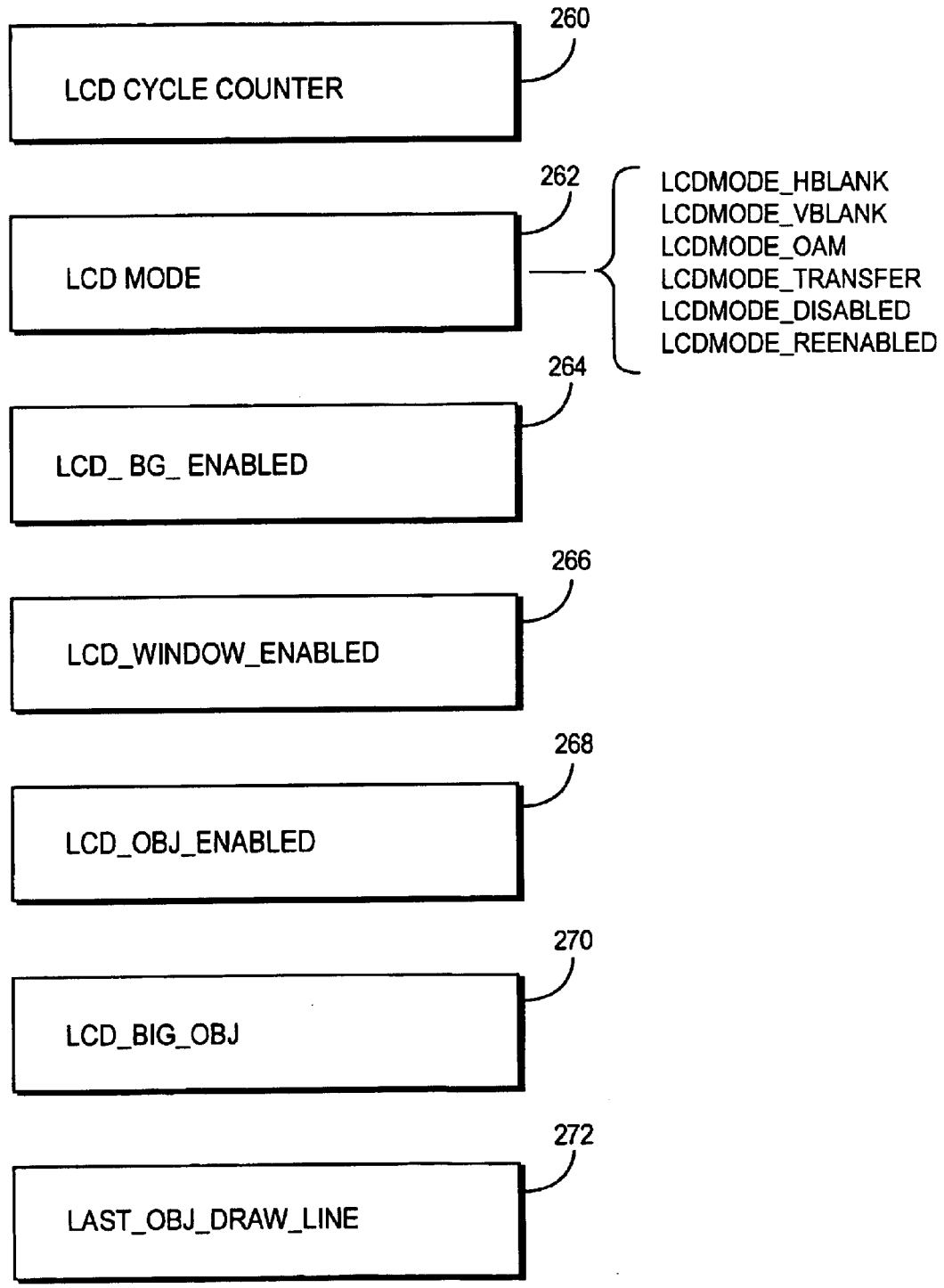
Figure 10:
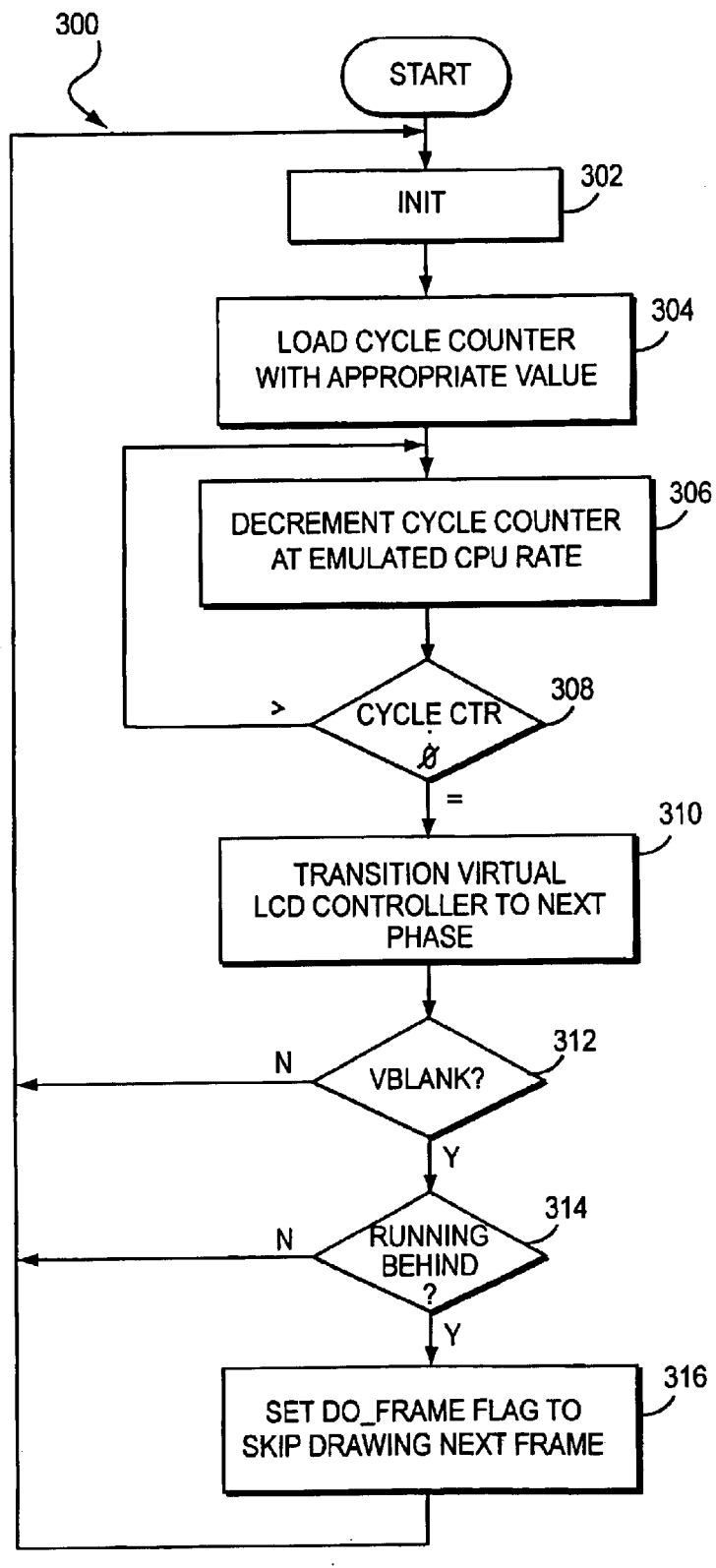
FIG. 10 shows an example flow diagram of an emulated liquid crystal display controller.
Figure 11:
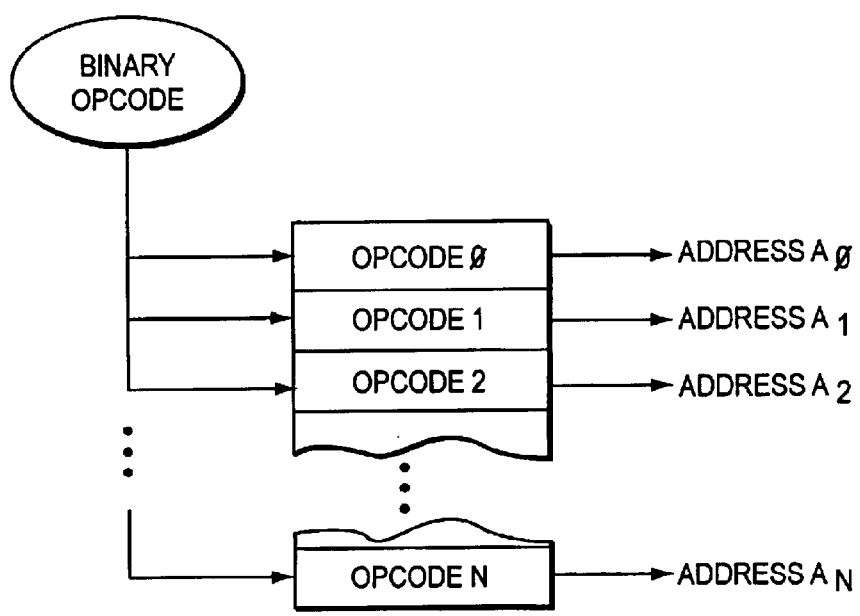
FIG. 11 shows an example op code jump table.
Figure 12:
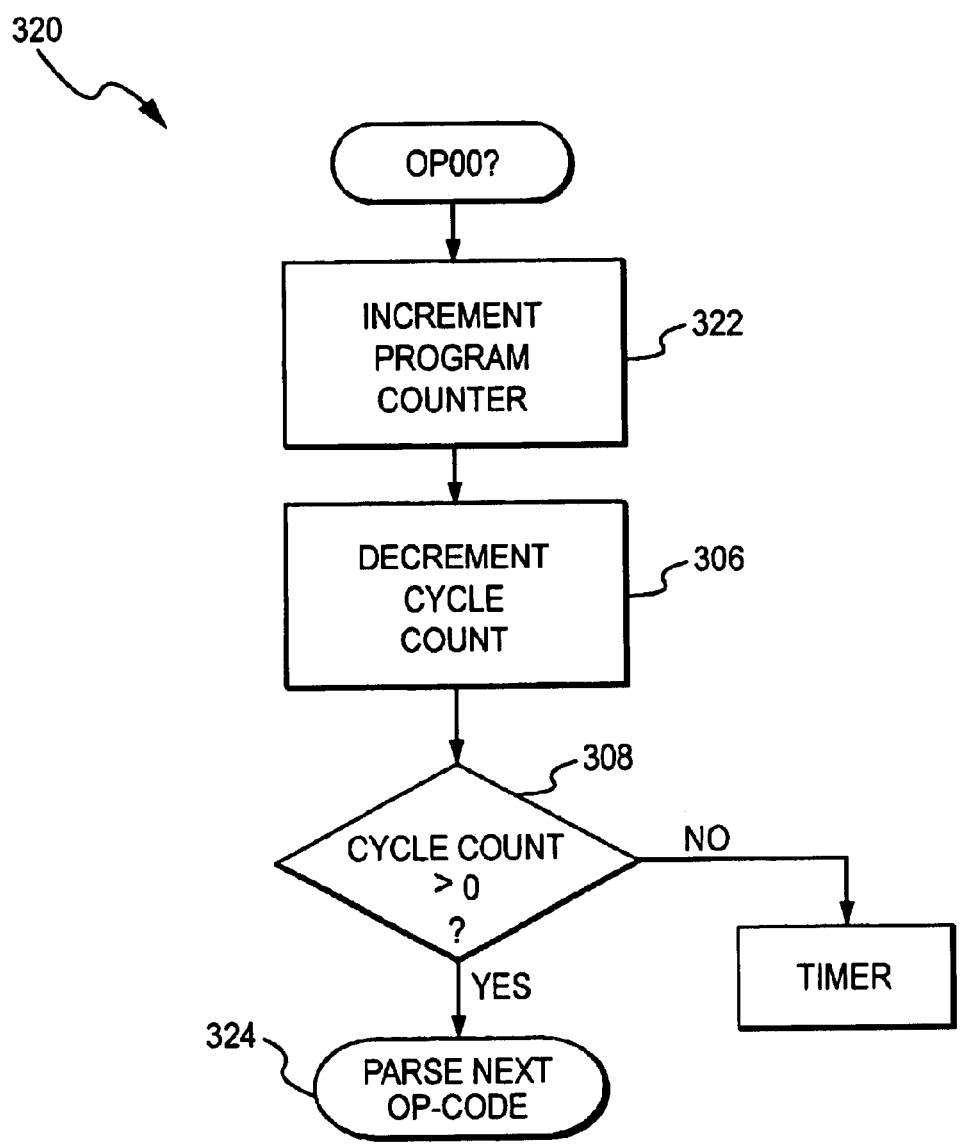
FIG. 12 shows example emulation of a particular (NOP) instruction.
Figure 13:
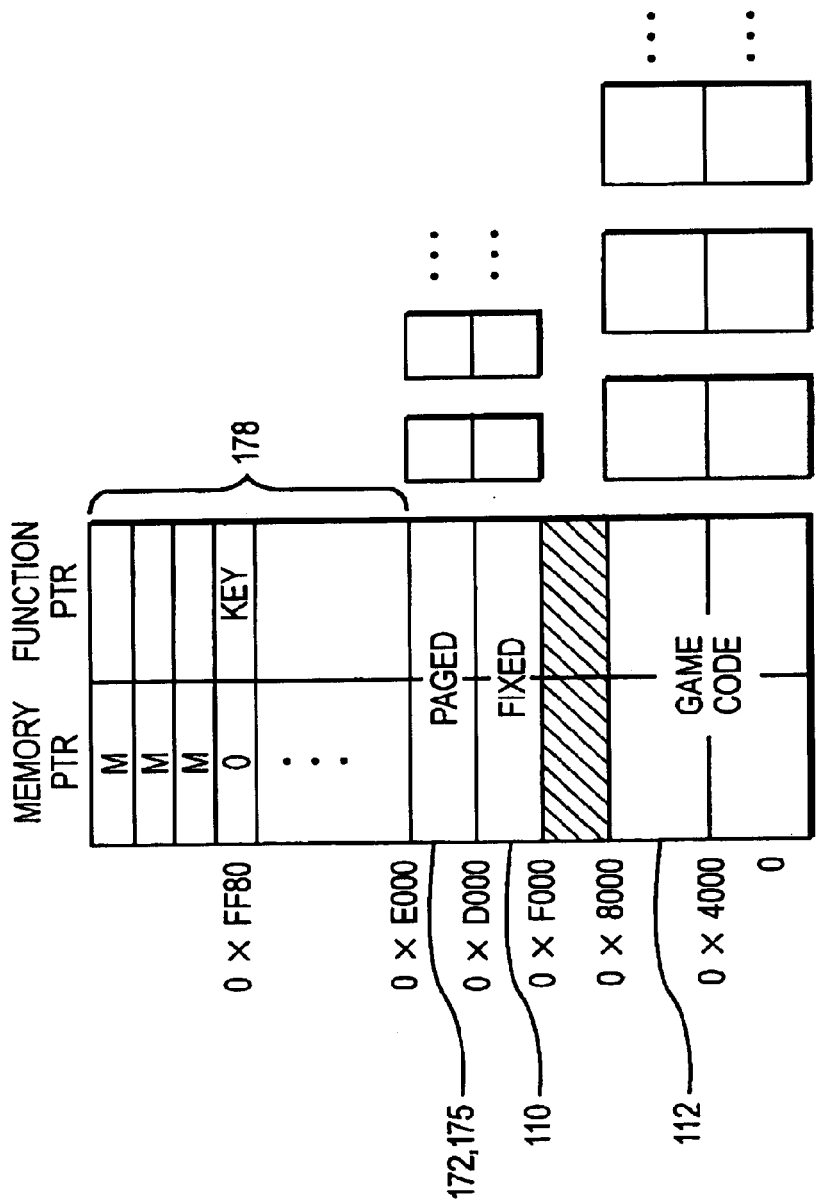
FIG. 13 shows an example page table.
Figure 14:
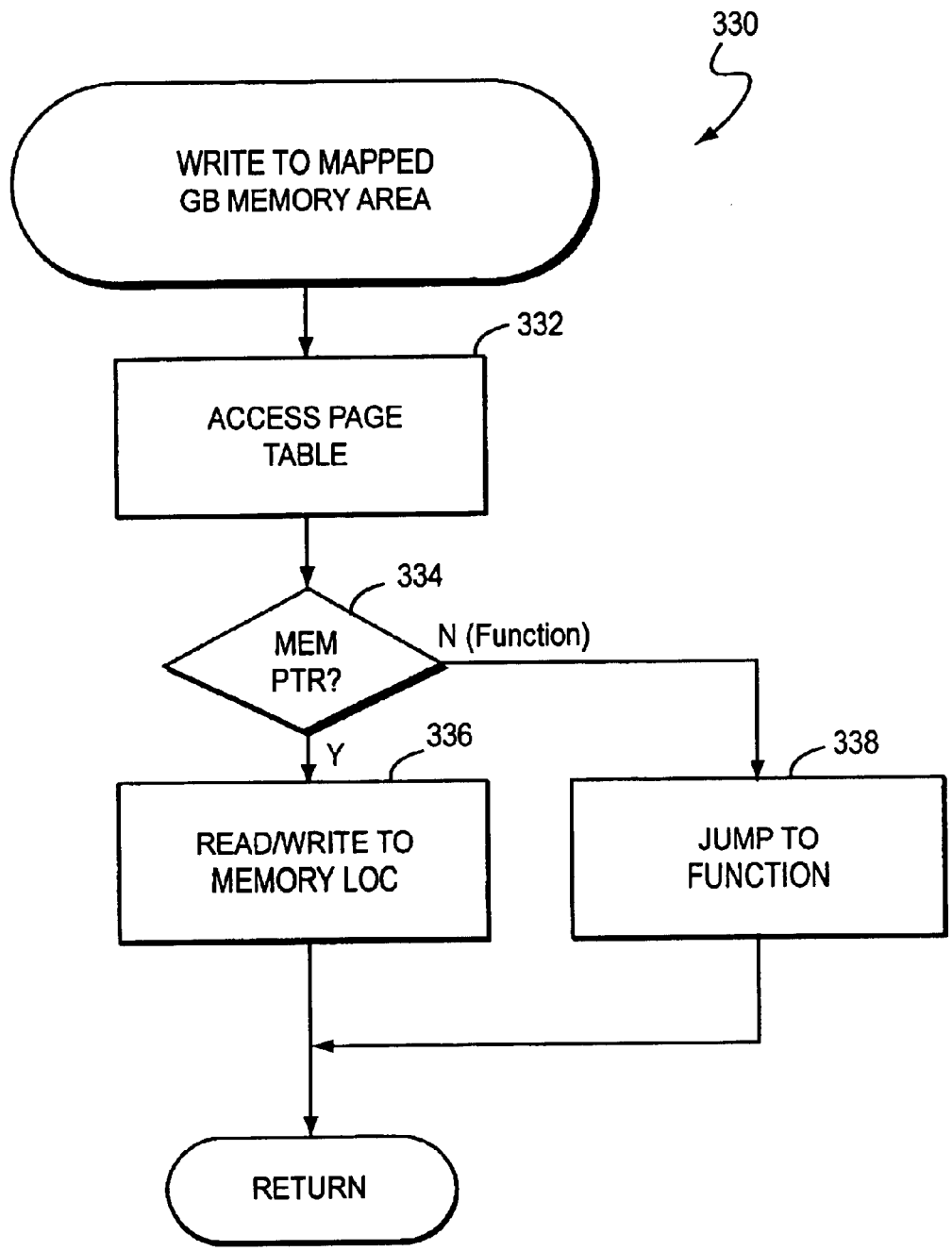
FIG. 14 shows an example memory access operation.
Figure 16:
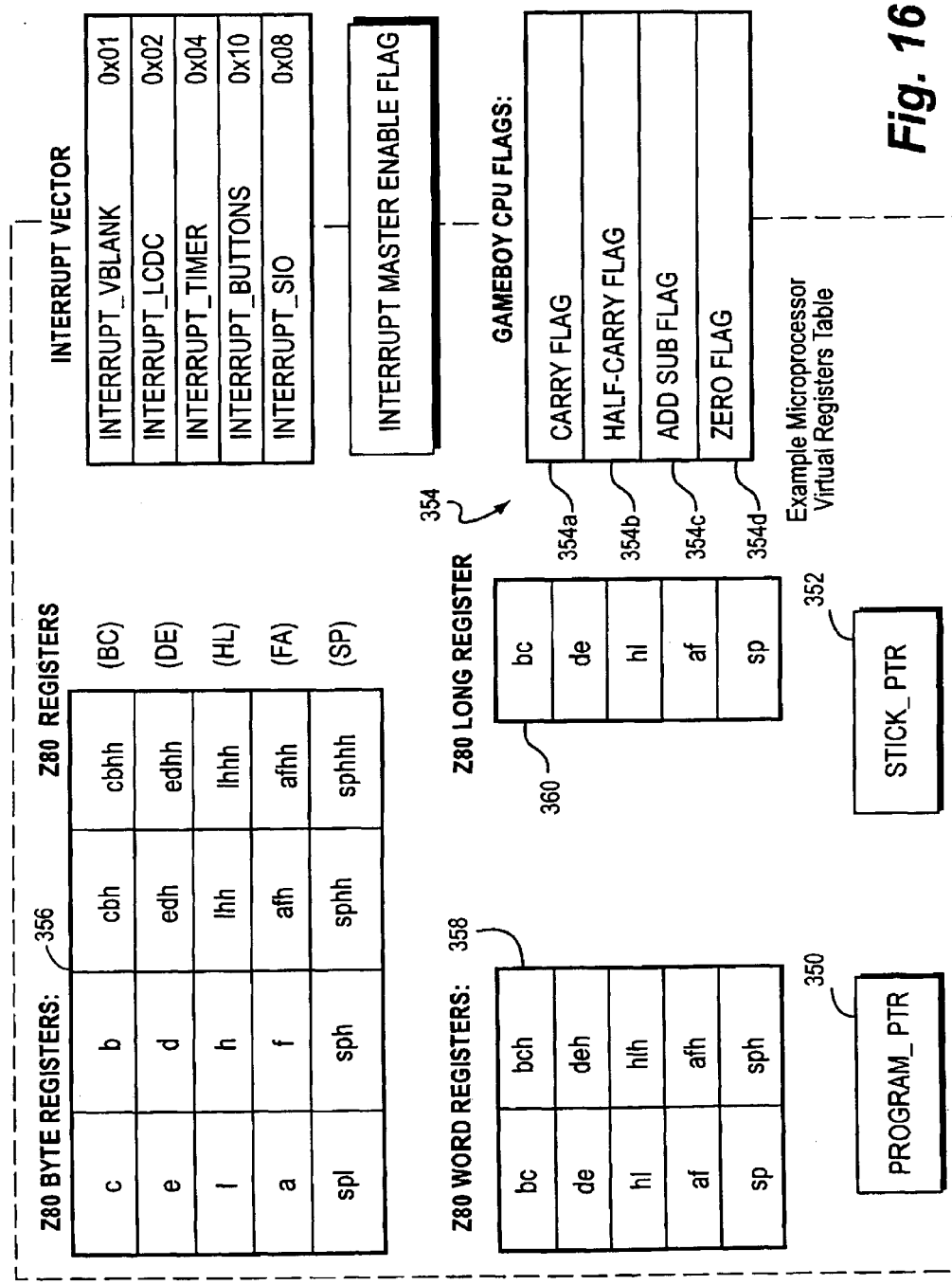
FIG. 16 shows example virtual microprocessor registers.
Figure 17:
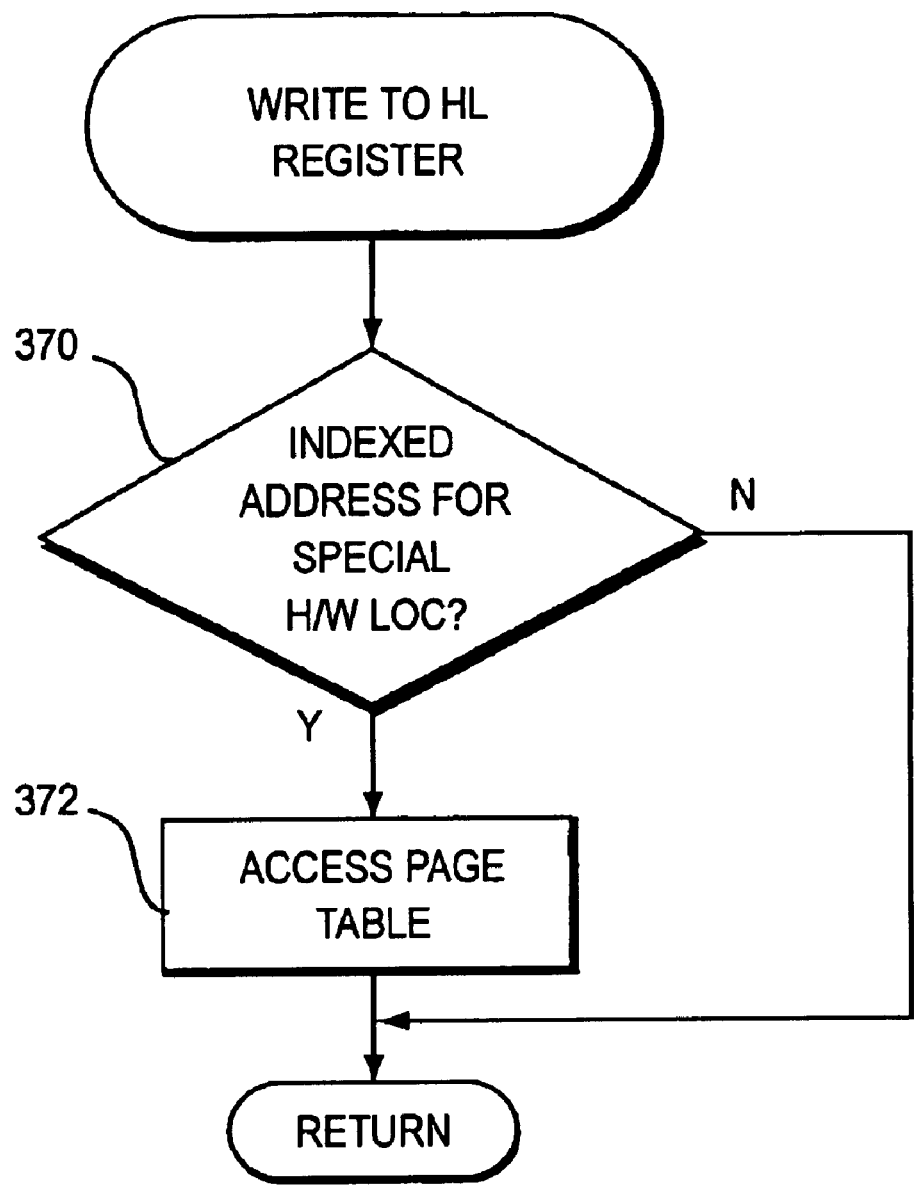
FIG. 17 shows an example HL register write optimization.
Figure 18:
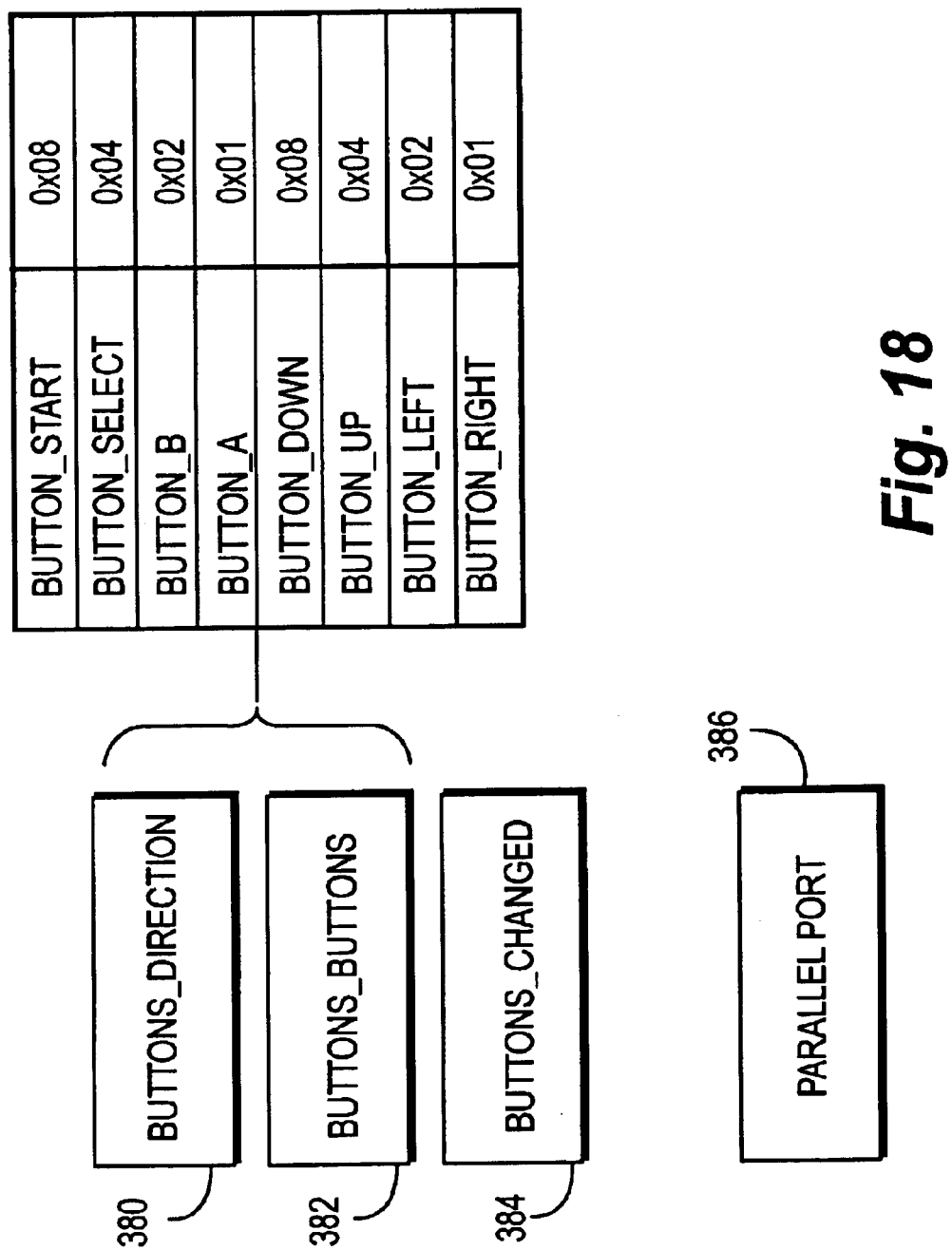
FIG. 18 shows an example input controller emulation register set.
Figure 19A:
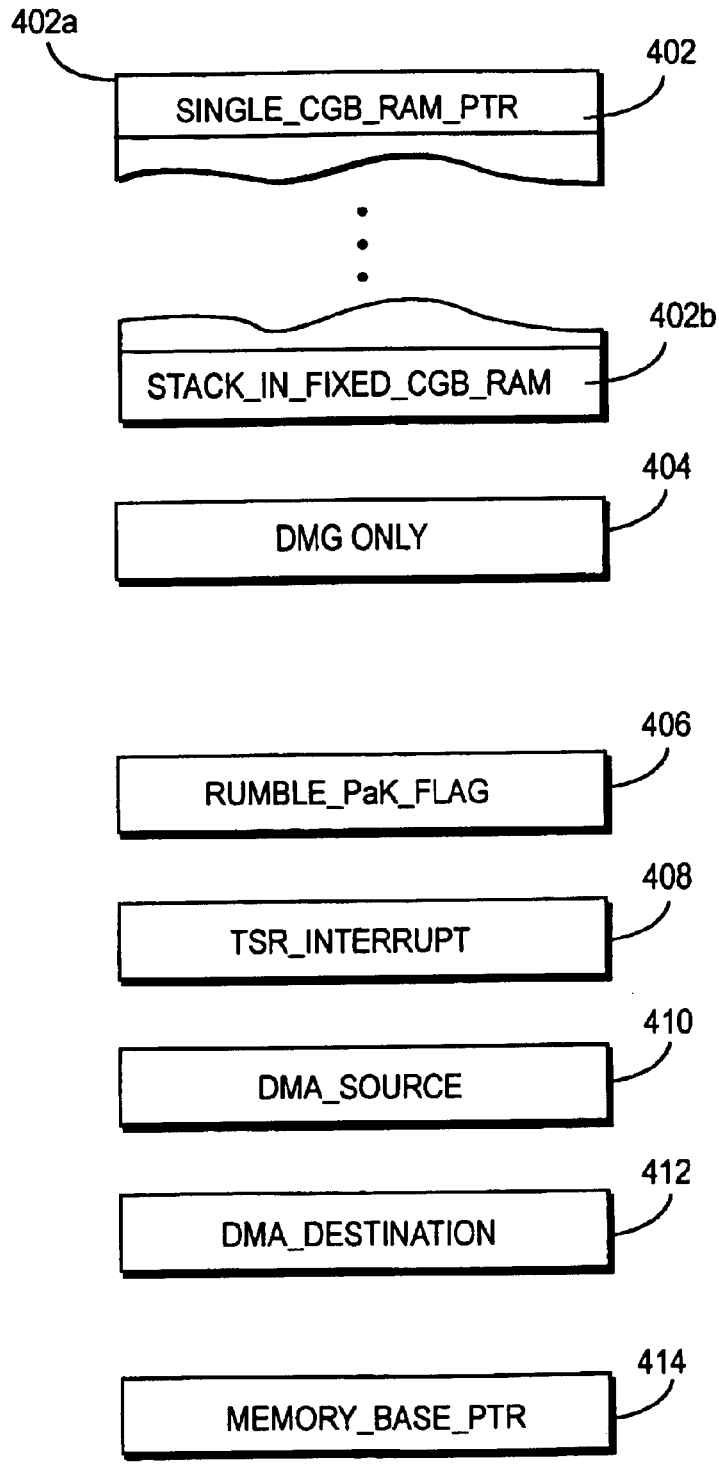
Figure 20:
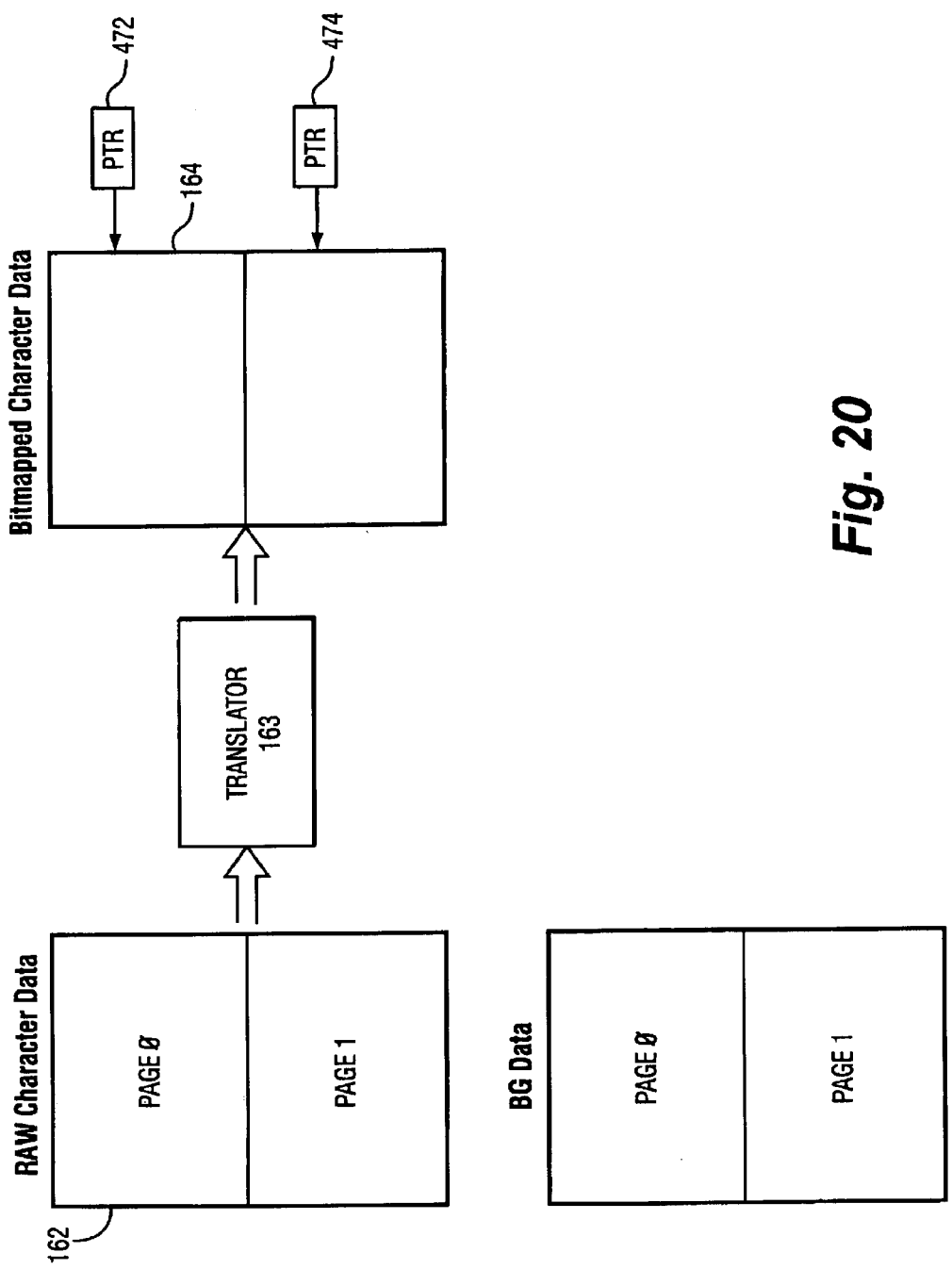
Figure 21:
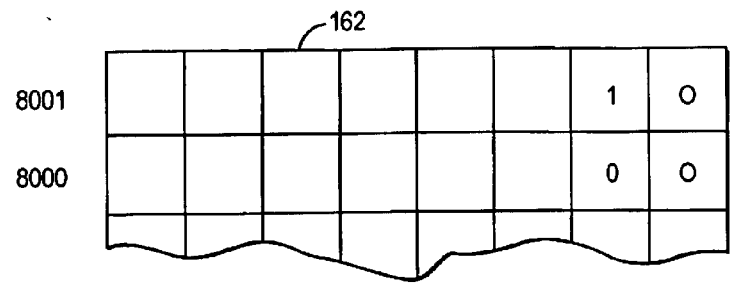
FIG. 21 shows an example native character data.
Figure 22:
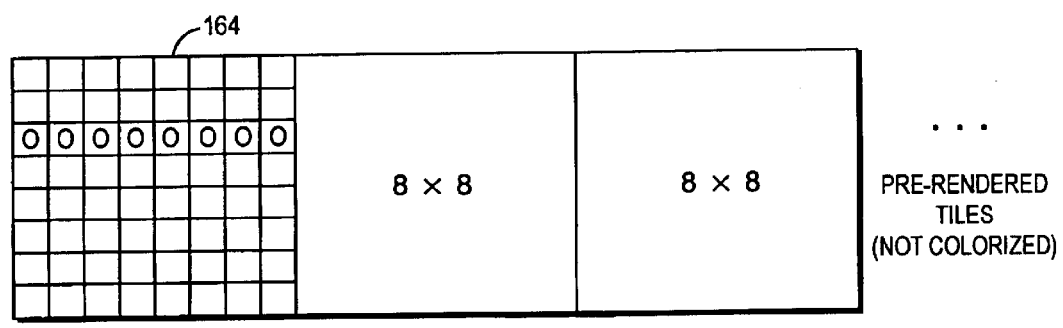
FIG. 22 shows example pre-rendered un-colorized "bitmap-ized" character tiles.
Figure 23:
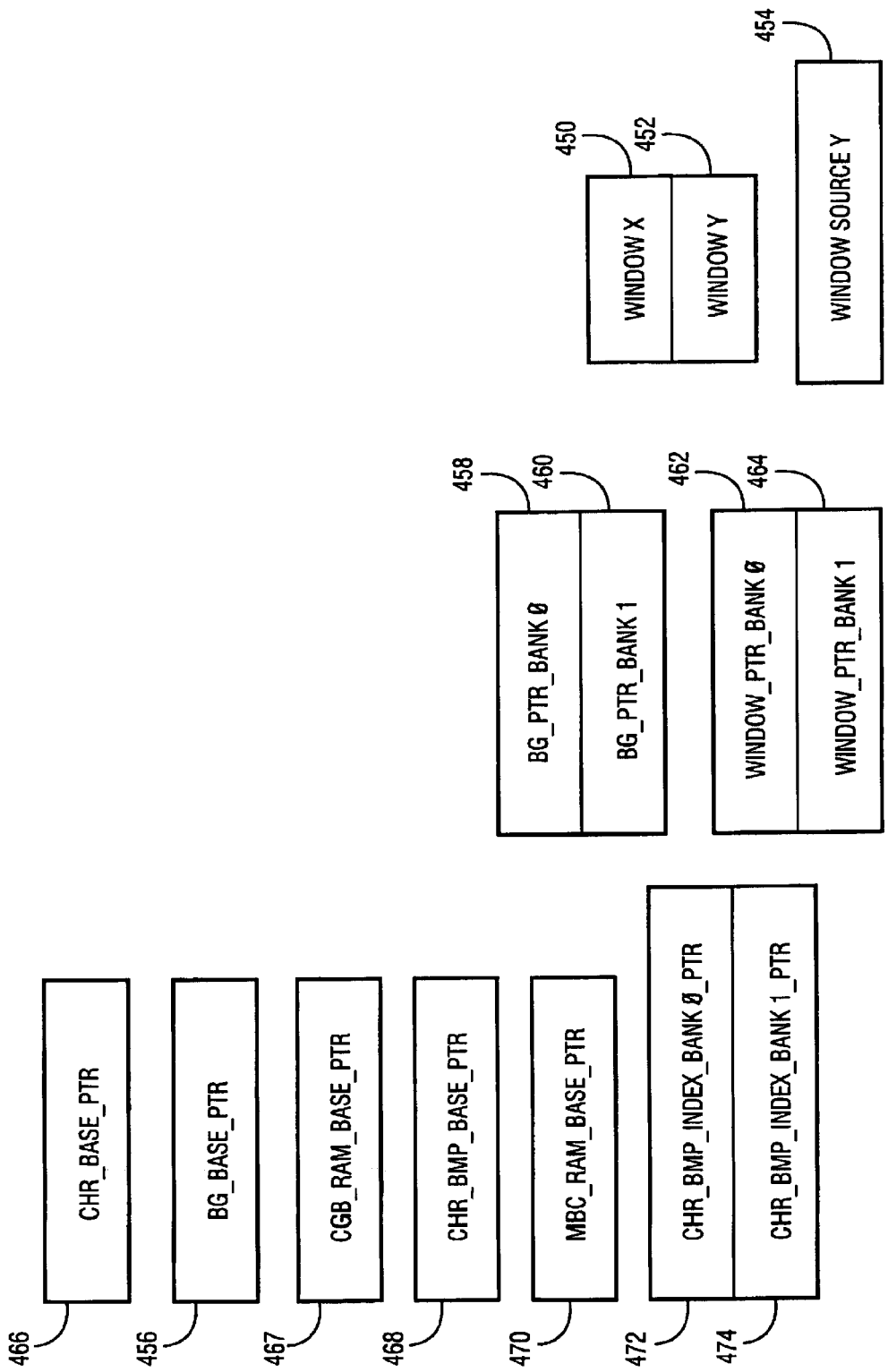
FIG. 23 shows example graphics object pointers.
Figure 24:
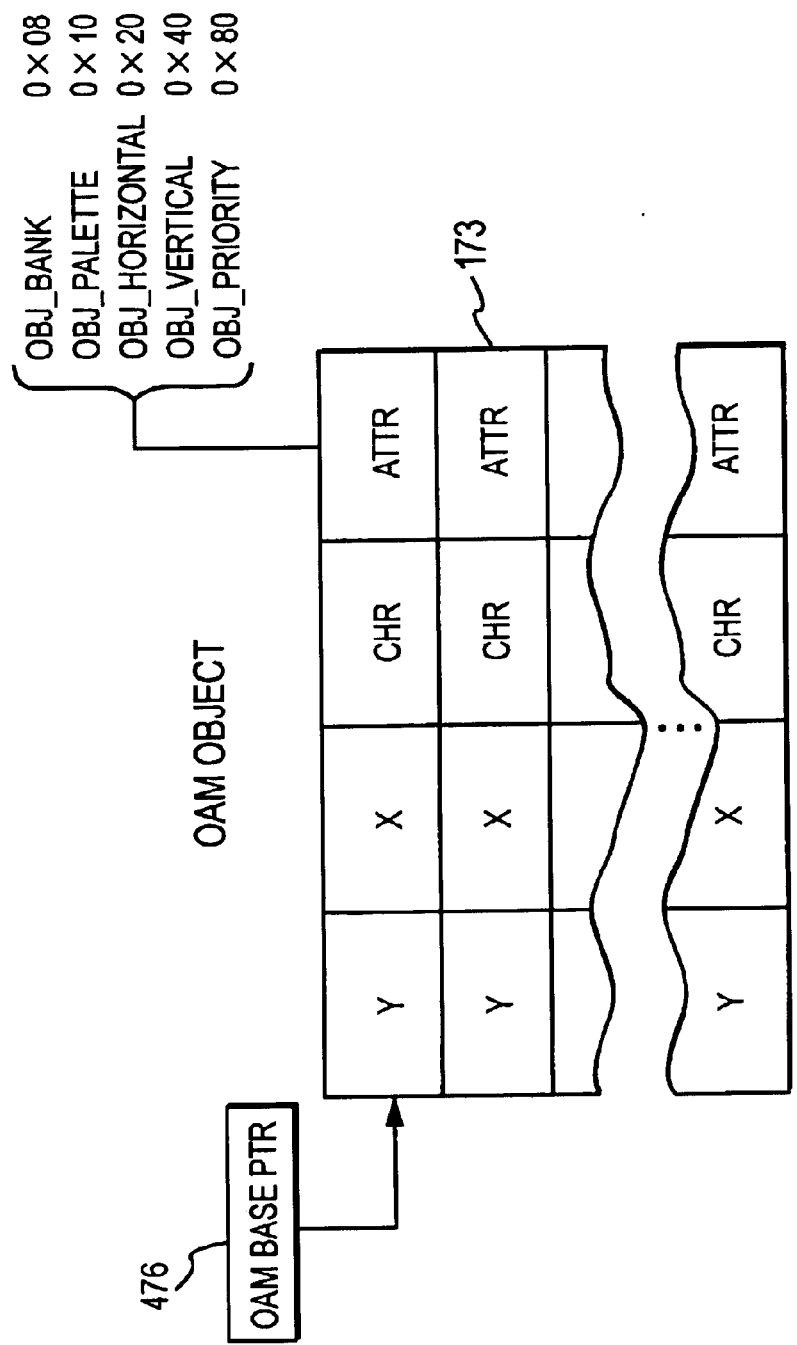
FIG. 24 shows example emulated object attribute memory.
Figure 25:
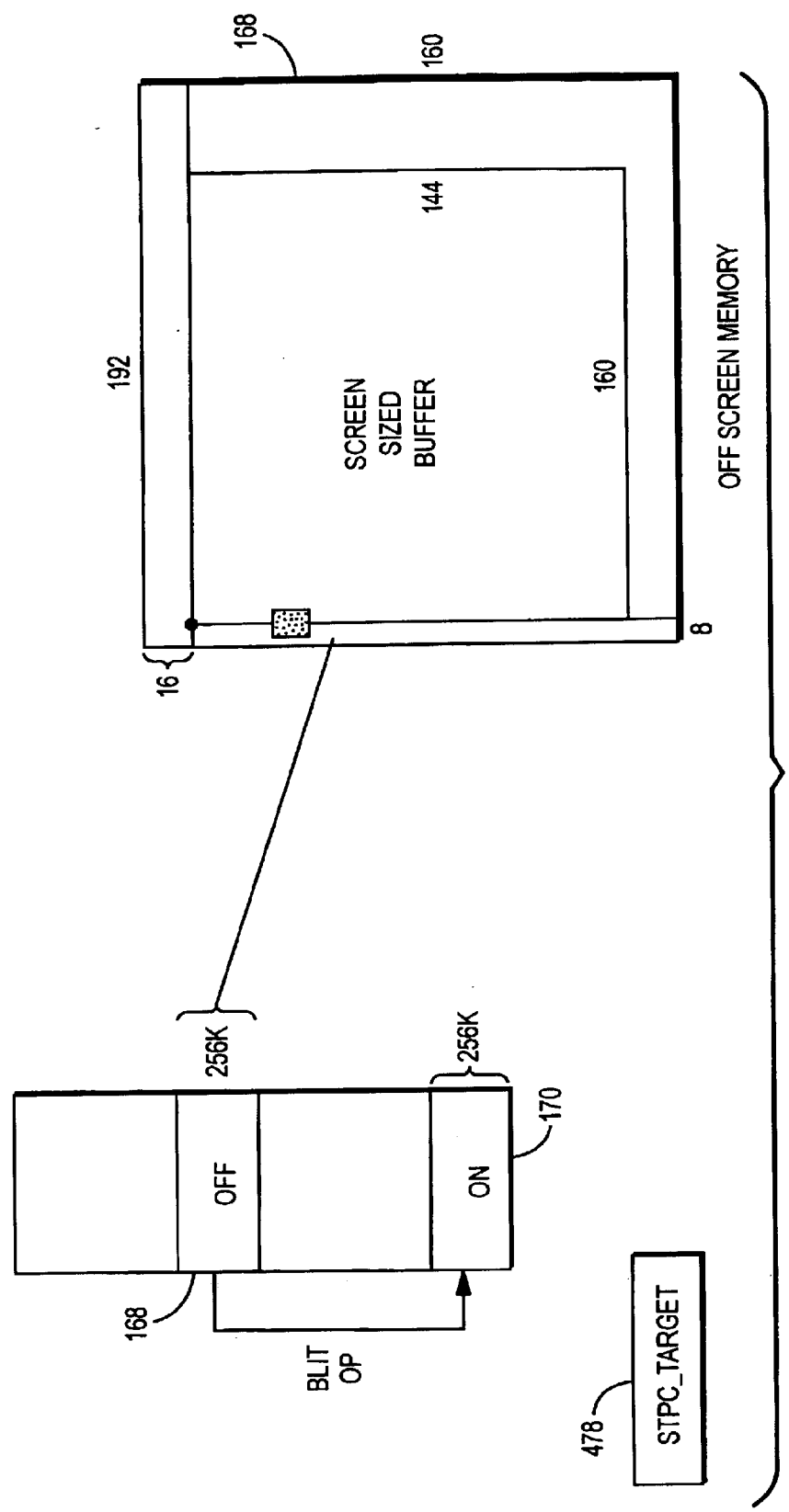
FIG. 25 shows an example video memory transfer process.
Figure 26:
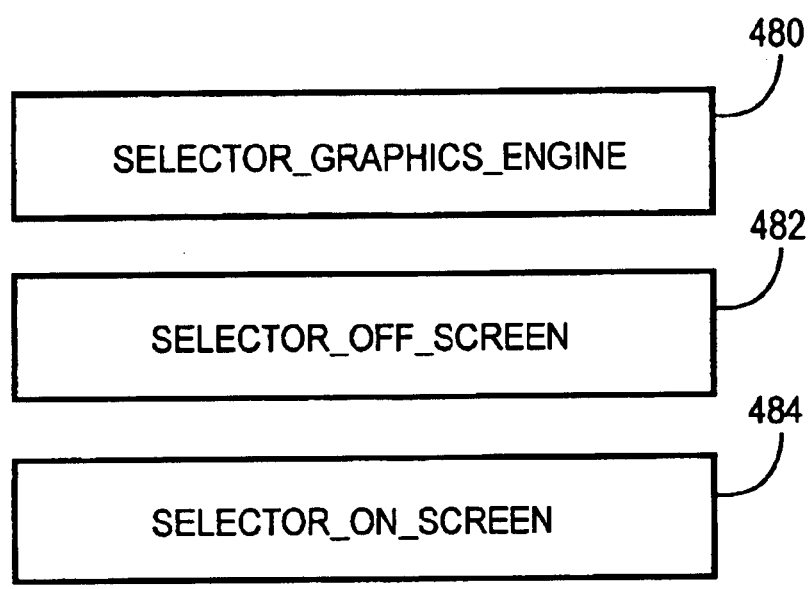
FIG. 26 shows example graphics mode selectors.
Figure 27:
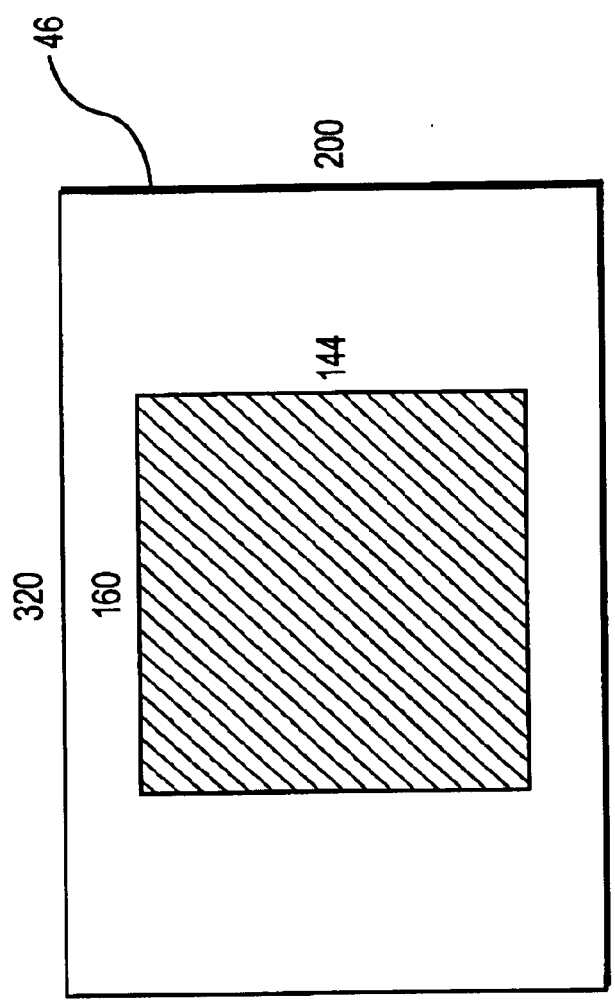
FIG. 27 shows example screen layouts.

The memory manager engine 600 in the example embodiment maintains and simulates RAM and ROM memory areas. Memory manager engine 600 also keeps track of paged memory. This requires extra work when the 0xFFxx page is accessed—since hardware registers are mapped into this page. If a timer is enabled as a result of a series of writes to this page, memory manager engine 600 "pokes" a value into a timer table corresponding to the number of Z80 clock ticks for the timer value. In the example embodiment, this timer can be programmed to fire every n clock tick. The timer table may include six entries—four corresponding to the four possible timers and one for each h sync and v sync of the original platform (see FIG. 4). The microprocessor emulator engine 500 as well as the remainder of the emulator performs all necessary processing between vertical blanking periods at a rate equivalent to the original platform processor clock. If this processing overlaps any given vertical blanking period, the screen update is skipped for that period. In the example embodiment, the frame rate is thirty frames per second. If interframe processing cannot be completed before the next vertical sync, then the frame is skipped to allow the emulator to catch up. This allows certain games to run properly at a reduced frame rate. Reductions in required frame rate may be altered on a title-by-title basis. In the example embodiment, the smallest value of the x' column is passed to the microprocessor emulator engine 500, where it is counted down to zero. When zero is reached, the microprocessor emulator engine 500 instructs memory manager engine 600 to update the timer table values shown in FIG. 4. At this point, all table values are updated and a software function is called to handle the timer interrupt.

Memory manager engine 600 also handles all direct memory access requests in the example embodiment. This may be done in-line with assembly language if necessary for speed performance. The following types of direct memory access requests are serviced by memory manager engine 600 in the example embodiment:

from main RAM 0h-DFFFh to object attribute memory, 16 bytes from ROM and work RAM to VRAM during next horizontal blanking interval, and memory transfer from ROM and work RAM to VRAM during vertical blanking.

EXAMPLE VIDEO EMULATOR ENGINE 800

In the example embodiment, the video emulator engine 800 includes a pair of off-screen buffers as described above and is responsible for transferring (e.g., using a conventional BLIT operation) the off-screen screen buffer contents to active video memory on vertical blanking interval. The video emulator engine 800 is also responsible for maintaining color palette information. As explained above, the color palette for the game or other application currently being emulated is created by the emulator at run time.

Vertical synchronization in the new platform may be asynchronous (as it is in the original platform). The microprocessor emulator engine 500 and memory manager 600 preferable keep track of vertical blanking as it would have occurred on the original platform, and also keep track of vertical blanking as it is actually occurring on the new platform. A BLIT from the current screen buffer to the active video memory may occur during any vertical blanking interval on the new platform as long as a vertical blank is not being simulated at the same time for the original platform. Example minimum display resolution of 160×144 pixels may be provided.

The video emulator engine 800 in the example embodiment maps each original platform color palette to the closest matching SVGA controller color palette for each screen based on subjective criteria. This mapping is performed in a manner that maintains optimal game play with no color jitter or irregularities.

EXAMPLE SOUND EMULATOR ENGINE 700

In the example embodiment, sound emulator engine 700 simulates the four sound synthesizers of the original platform using a conventional sound blaster sound synthesizer. The sound emulator engine 700 interprets sound instructions on-the-fly and translates them into sound blaster commands compatible with the sound blaster API. Adequate time must be allowed to program the sound blaster registers (for example, the FM synthesizer requires over 200 set up instructions). Additionally, it is desirable to synchronize sound generation with real time (e.g., latency between when sounds should start and when they actually do start should not differ by more than about 16 milliseconds to ensure proper synchronization between sound and display).

EXAMPLE USER CONTROLLER INPUTS

While not shown in FIG. 2J, the emulator also receives and processes user-manipulable control inputs in real time. In one example, a game controller input provided in the original platform is simulated using a personal computer keyboard. For example, key up and key down messages received from the conventional keyboard controller can be translated into particular control inputs as would appear based upon depression or other operation of control switches and other configurations of the original platform.

One example emulator is to take Game Boy Color (hereafter known as "CGB") and Game Boy (hereafter known as "DMG") binary files and execute these files natively on all Intel based seat box computers for Matsushita system 2000E and 3000 in-flight systems including compatibility with all controllers on the Matsushita systems.

EXAMPLE TECHNICAL DETAILS AND SPECIFICATIONS

One example illustrative emulator 100 is compatible with the MAS S3000 32 Mb or 64 Mb DSEB and the MAS 2000E 486 16 Mb IVASEB made by Matsushita, and may also run on the original MAS 2000E IVASEBs 386sx25 4 Mb to 386sx33 16 Mb. There can be 2 versions of the CGB emulator to support both Win 3.1 and Linux. The MAS 2000E 486 IVASEB runs Win 3.1 in enhanced mode. The MAS S3000 DSEB will run either Win 3.1 in enhanced mode or Linux.

Additional design considerations for CGB emulator 100 are as follows:

Z80 runs at two clock speeds: DMG/CGB, 4 MHz/8 MHz

Two Z80 instruction speeds: .954 microseconds & .477 microseconds

LCD display 160×144 (+10 vertical blank)

59.7 frames/second==16.75 milliseconds/frame ==16750 microseconds

Clocks/horizontal blanking==1/59.7/(144+10)/(.477/1e+6)=228 Z80 clocks/horizontal line (double speed)=114 Z80 clocks/horizontal line (normal)

Some GAME BOY® cartridges use one of a variety of memory management chips (called MBC1-5). The following cartridge issues are addressed in the exemplary emulator 100:

1. paged ROM
2. paged RAM
3. real time clock
4. different behavior for each cartridge The device D in the example embodiment uses a modified Z80 microprocessor with certain specialized hardware. The input/output, clock generator, timing control, data buffer and address buffer are not shown in FIG. 2J, but are part of the system. Shown are the example hardware elements that emulator 100 emulates.

DSEB PC 486 80 MHz

Instruction clock=.0125 microseconds

One Z80 clock==38 x86 clocks (486 has single instruction pipe)

During one horizontal line period==8,701 x86 clocks

During one vertical blanking period==87,015 x86 clocks

During one frame==1,339,954 clocks

Windows 3.1 running in enhanced mode x86: core processing is fast, I/O is slow

I/O

Types of I/O:

1. Real time clock
2. Video register access
3. Programming sound chip
4. Programming timer/counter maintain three counters:

Windows 16-bit:

1. Windows runs at each system timer tick (55 milliseconds)
2. Support code such as heart beat, MAS system message are processed during system tick
3. The emulator 100 pauses when public address system is on with notification from MAS.
4. Original MAS system only has 1 megabyte of RAM available for application Linux:

32-bit

1. SVGA mode and/or X-window
2. Multi-tasking so that MAS support is accomplished without yield
3. Timer tick is "jiffy" about 10 milliseconds, but may be different

EXAMPLE TARGET PLATFORM

The emulator system described above might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of the system. The emulator could also comprise a personal digital assistant (PDA) that simulates the hardware and/or firmware of the system. An emulator may execute the game software so that a particular game functions and/or appears somewhat differently from how it functions and/or appears on its intended platform. Thus, the emulator may show a color game in monochrome or a play a game without its accompanying sound. Emulation as used herein is intended to include emulation that results in these and other such differences in functions and/or appearance.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of the system. Emulator software controls the hardware resources on the personal computer platform to simulate the processing, graphics, sound, peripheral and other capabilities of the portable game machine platform for which the game programmer wrote the game software. Similarly, PDAs running emulator software may have sufficient performance to approximate the graphics and sound performance of the system.

FIG. 2M illustrates an example overall emulation process using a host platform 1201, an emulator component 1303, and a game software executable binary image provided on a storage medium 42. Host 1201 may be a general or special purpose digital computing device such as, for example, a personal computer, a laptop computer, a palm-top computer, a video game console, a portable game machine, a personal digital assistant, an internet appliance, a set-top box, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by portable game machine 10 from storage medium 42 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1203 fetches one or a sequence of binary-image program instructions from storage medium 1305 and converts these program instructions to one or more equivalent Intel binary-image program instructions. The emulator 1203 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 100 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

FIG. 2M illustrates an example emulation host system 1201 suitable for use with emulator 100. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) (or RAM) 1252 and random access memory (RAM) 1254. A basic input/output system (BIOS) 1256, containing the basic routines that help to transfer information between elements within personal computer system 1201, such as during start-up, is stored in the ROM (RAM) 1252. In one exemplary embodiment, the BIOS may be loaded through software at startup time of device D; in other example, the BIOS may be resident in ROM.

System 1201 may further include optional additional drives and associated computer-readable media. For example, a hard disk drive 1209 reads from and writes to a (typically fixed) magnetic hard disk 1211. An additional (optional) magnetic disk drive 1213 reads from and writes to a removable "floppy" or other magnetic disk 1215. An optional optical disk drive 1217 reads from and, in some configurations, writes to a removable optical disk 1219 such as a CD ROM or other optical media. Hard disk drive 1209 and optical disk drive 1217 can be connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used. Note that these additional peripheral devices are generally not used in airline seat back controllers or set top boxes, but could be present in other configurations.

A number of program modules including emulator 100 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include an optional modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 2D or 3D graphics rendering in response to graphics commands issued based on a standard graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 1305.

An emulator 100 used to provide some or all of the features of the video game system described above may also be provided with a graphic user interface (GUI) that simplifies or automates the selection of various options and screen modes for games run using the emulator. In one example, such an emulator 100 may further include enhanced functionality as compared with the host platform for which the software was originally intended.

Figure 2N:
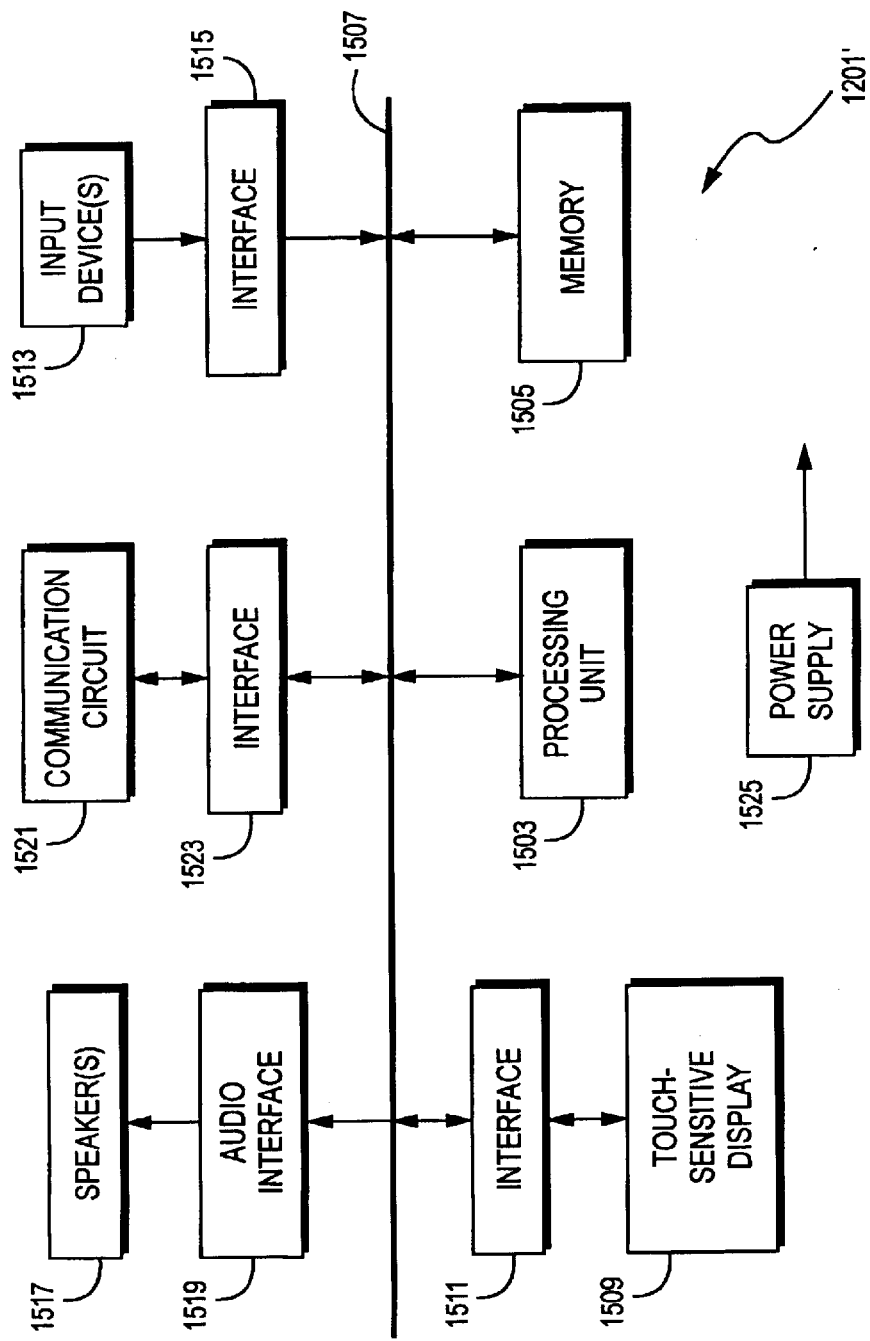
FIG. 2N shows a further example, illustrative general purpose computing device block diagram.

FIG. 2N illustrates another example emulation host system 1201' suitable for use with emulator 100. The emulation host system in FIG. 2N is generally configured along the lines of a personal digital assistant such as those available from Palm Inc., Handpsring, Inc. and Sony and running an operating system such as Windows CE, EPOC or PalmOS. Typically, such personal digital assistants provide capabilities for a diary/scheduler, to-do lists, phone/address books and the like. System 1201' includes a processing unit 1503 and memory 1505. A system bus 1507 couples various system components including memory 1505 to processing unit 1503. Memory 1505 includes read only memory (ROM) 1252 and random access memory (RAM) 1254. A basic input/output system (BIOS), containing the basic routines that help to transfer information between elements within system 1201', such as during start-up, is stored in the ROM 1252. Memory 1505 may also include external memory in the form of memory cards or memory sticks inserted into a suitable port provided in the housing for the components of system 1201'. A touch-sensitive display screen (e.g., a touch-sensitive liquid crystal display screen) 1509 is also connected to system bus 1507 via an interface 1511. Inputs via touch-sensitive screen 1509 are typically made using a stylus. Other input devices 1513 such as pushbuttons, switches, pointing devices and the like are also connected to system bus 1507 via an interface 1515. The input devices may also include external keyboards or game control devices (e.g., joystick, game controller). The input devices may be used as game controls (e.g., starting the game, character movement, character action, etc.) when system 1201' is used with emulator 100. Games may be written to memory 1505 using communication circuit 1521 which may take the form of a modem for downloading the game from the Internet, for example, or of a cradle (e.g., a USB cradle) for connecting system 1201' to a personal computer.

One or more speakers or headphones 1517 are connected to system bus 1507 via an audio interface 1519 to output sounds. A communication circuit 1521 is connected to system bus 1507 via a communications interface 1523 to permit communication with other devices. By way of illustration, communication circuit 1521 may, for example, be a modem and/or communications interface 1523 such as a serial port. Generally speaking, communication circuit 1521 may be configured for wired or wireless communication in accordance with any conventional communication protocol. A power supply 1525 provides power for the components of system 1201'.

EXAMPLE EMULATOR ARCHITECTURE

Figure 20:
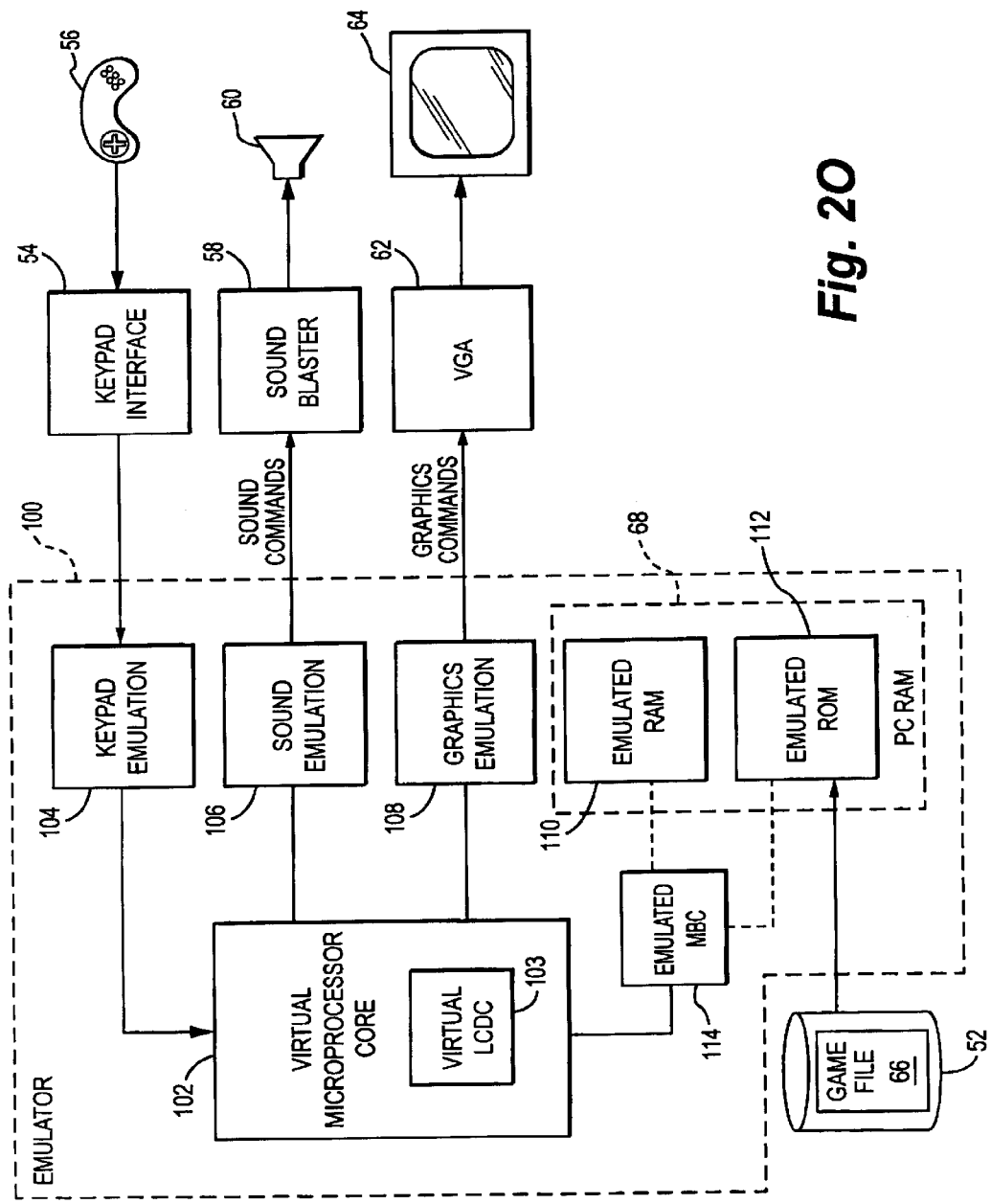
FIG. 20 shows an example graphics emulation optimization.

FIG. 20 shows an example more detailed software emulator 100 provided by a preferred embodiment of the invention. Emulator 100 is designed to operate on a target platform of the types described above, but could run on any desired platform.

In the example embodiment, the target platform includes:
- a microprocessor (e.g., an Intel 386);
- a local or remote disk-based or other file system 52;
- a keypad interface 54 coupled to a handheld controller 56;
- a sound blaster or other audio interface card 58 coupled to a loud speaker or other sound transducer such as headphones; and
- a VGA or other graphics adapter 62 that outputs video information to a display 64 such as a liquid crystal display screen or video monitor.

Emulator 100 (which executes on the target platform microprocessor and uses the resources of the target platform) receives the binary image of a game (or other application) file 66 stored on disk or other file system 52. Emulator 100 parses and interprets this binary image. Emulator 100 also receives user inputs from handheld controller 56 via target platform keypad interface 54. In response to these inputs, emulator 100 generates sound commands for the audio adapter 58 and generates graphics commands for application to the video graphics adapter 62—creating sounds on audio transducer 60 and images on display 64. These sounds and images nearly duplicate what one would hear and see if running file 66 on a native GAME BOY® platform.

In the example embodiment, the game file binary image 66 can be a video game or any other application that can run on a GAME BOY®, COLOR GAME BOY® or GAME BOY ADVANCE®. Binary image 66 includes binary audio commands and binary graphics commands, compatible with a GAME BOY® native platform but which are not compatible with the application programming interface features of audio interface 58 and VGA adapter 62. Emulator 100 interprets those graphics commands and sound commands, and generates a corresponding sequence of graphics and sound commands that are understandable by and compatible with the audio and sound capabilities of the target platform.

In the example embodiment, emulator 100 includes a virtual machine including a virtual microprocessor core 102. Virtual microprocessor core 102 interprets instructions within the binary game file 66 that would be executed by the actual GAME BOY® native platform (Z80) microprocessor, and provides a corresponding sequence of microprocessor instructions for execution by the target platform microprocessor (which in the general case, is different from the microprocessor found in GAME BOY® and does not understand and is incompatible with the native platform microprocessor instruction set).

Virtual microprocessor core 102 receives inputs from a keypad emulation block 104. Block 104 in turn, receives interactive inputs from the user via target platform keypad interface 54. Keypad emulator block 104 emulates the GAME BOY® control input circuitry and associated functionality and translates inputs received from the target platform keypad interface—which may have a different set of control inputs and configurations from that found in a GAME BOY® native platform.

Virtual microprocessor core 102 also communicates with sound emulation block 106 and graphics emulation block 108. Sound emulation block 106 emulates or simulates the sound generation circuitry within a GAME BOY®, GAME BOY COLOR® and/or GAME BOY ADVANCE® to provide a set of sound commands for application to the target platform sound adapter 58. Graphics emulation block 108 emulates or simulates the hardware acceleration and other graphics circuitry found within a GAME BOY®, GAME BOY COLOR® and/or GAME BOY ADVANCE® platform to provide a set of graphics commands for application to a target platform graphics adapter 62.

In the example embodiment, virtual microprocessor core 102 also includes a virtual liquid crystal display controller 103 used for the purpose of maintaining timing. Events within the GAME BOY®, GAME BOY COLOR®, and GAME BOY ADVANCE® native platforms are generally driven by activities relating to updating the liquid crystal display every one-sixtieth of a second. The example embodiment of emulator 100 emulates the native platform liquid crystal display controller in order to synchronize events occurring within the emulator with emulated events that would occur within a GAME BOY®, GAME BOY COLOR®, and/or GAME BOY ADVANCE® native platform. As will be described below in detail, the virtual liquid crystal display controller 103 of the example embodiment does not actually perform any display functions, but rather is used to tell emulator 100 what would be going on in terms of display timing on a real GAME BOY®, GAME BOY COLOR®, or GAME BOY ADVANCE®. A virtual liquid crystal display controller 103 allows emulator 100 to synchronize its pace with what the pace of a real GAME BOY®, GAME BOY COLOR®, and/or GAME BOY ADVANCE® native platform would be running the same application file 66. Virtual liquid crystal display controller 103 may be viewed as a software-implemented model of the event timing sequence of a GAME BOY®, GAME BOY COLOR®, and/or GAME BOY ADVANCE® (native platform.

Emulator 100 also includes an emulated random access memory 110, an emulated read only memory 112, and an emulated memory bank controller (MBC) 114. Emulated random access memory 110 and emulated read only memory 112 provide memory storage locations within the (read/write) random access memory 68 of the target platform. The emulated random access memory 110 emulates or simulates the random access memory of a GAME BOY®, GAME BOY COLOR® and/or GAME BOY ADVANCE®, and the emulated read only memory 112 emulates or simulates the read only memory within the game cartridge of a GAME BOY®, GAME BOY COLOR® and/or GAME BOY ADVANCE®. The emulated memory bank controller 114 emulates or simulates the hardware memory bank controller (bank switching) circuitry found within certain a GAME BOY®, GAME BOY COLOR® and/or GAME BOY ADVANCE® game cartridges.

In one example embodiment, emulator 100 may provide certain game-specific functionality, i.e., it may change or optimize its emulation characteristics dynamically depending on the particular game G being played, in order to achieve better speed performance, audio playback, or other characteristics. This can be implemented in a variety of ways. In one preferred illustrative embodiment, header information associated with each game file G includes a set of "flags" that instructs the emulator 100 to set certain characteristics (e.g., enable within-frame color palette swaps, disable frame skipping, change virtual clock speed, enable full color, or any number of other values). In other example embodiments, emulator 100 could dynamically adjust its operation to accommodate different requirements based on tests performed before or during game execution.

EXAMPLE EMULATOR IMPLEMENTATION DETAILS

FIGS. 3–29 show at various levels of detail, one preferred exemplary implementation of an emulator 100 suitable for use in the preferred and exemplary system described herein. Explanation of those details and description of the corresponding figures may be found in U.S. patent application Ser. No. 09/723,322 entitled "Software Implementation Of A Handheld Video Game Hardware Platform" (Docket number 723–950), incorporated by reference herein.

In yet another embodiment, rather than creating a virtual machine, emulator 100 could operate based on dynamically compiling the game binary image into a different format. In this example, a compiler is written to accept a game binary image as source code and to generate an executable. The compile could be fully custom or could be a front end to an existing compiler (e.g., like the FORTRAN front end to the Gnu GCC compiler). In this example, one executable is generated for each game and no ROM files are required at run-time. This compilation process eliminates the overhead of interpreting opcodes and can result in higher efficiencies—since the output from the compiler is native target code that can execute directly on the microprocessor of device D. In one compiler embodiment, emulator 100 can be based on a precompilation procedure that requires game binary images to be preprocessed by running them through a compiler ahead of time. The resulting native target code is then downloaded from server S over network N to devices D for execution. In this example, there may still be a need for emulating non-CPU tasks as separate tasks, but the fact that native code can be executed by the device D microprocessor means that there is no need to emulate the source platform CPU. Of course, it may also be possible to match the microprocessor within device D so it is the same as the microprocessor within the source platform—obviating the need to emulate the CPU.

While the invention has been described in connection with what is presently considered to be the most practical and preferred embodiment, it is to be understood that the invention is not to be limited to the disclosed embodiment. For example, while the preferred embodiment has been described in connection with Nintendo's GAME BOY® handheld video game platform, the invention is not limited to GAME BOY® but could be used to emulate any other video game platform (e.g., Nintendo's NES, SNES or N64 game playing platforms, or platforms made by other manufacturers). Thus, the invention is intended to cover various modifications and equivalent arrangements included within the scope of the appended claims.

We claim:

1. A method for distributing video games from a server over a network including plural computing appliances disposed within a moving vehicle, said method comprising:
    displaying a general menu with plural applications at a first of said appliance;
    receiving at the server a request from said first appliance to play a video game;
    said first appliance requesting the server to download a software-based video game platform emulator over said network;
    the server downloading the software-based video game platform emulator over said network onto said first appliance;
    said emulator displaying at least one game pick menu on said first appliance;
    in response to a user selection of a game on said game pick menu, the server downloading a selected game file including a binary image file of the selected game over said network to said first appliance for interoperation with said emulator; and
    allowing a user to interact with said first appliance running said emulator to play a video game corresponding to said selected game file by interpreting the downloaded game file.

2. The method of claim 1 wherein said moving vehicle comprises an airplane.

3. The method of claim 1 wherein said moving vehicle comprises a train.

4. The method of claim 1 wherein said moving vehicle comprises a bus.

5. The method of claim 1 wherein said moving vehicle comprises a ship.

6. The method of claim 1 wherein said first appliance comprises a seatback controller.

7. The method of claim 1 wherein said first appliance comprises a set top box.

8. The method of claim 1 wherein said first appliance comprises a special purpose diskless personal computer.

9. The method of claim 1 further including displaying, on said first appliance, said video game within an image of a handheld portable video game player.

10. The method of claim 1 further including displaying, on said first appliance, textual help information in selectable different languages.

11. The method of claim 1 further including pausing said video game play in response to an intercom announcement.

12. The method of claim 1 further including providing game play audio on headphones.

13. The method of claim 1 further including decrypting said game file.

14. A vehicle-based video game distribution network comprising:
    at least one server disposed on a vehicle, said server storing a video game library comprising plural video game files, each video game file including a corresponding binary image file of the game;
    at least one user device disposed on said vehicle and connected to said server, said user device including a display, a user input interface, an audio playback transducer, and a processor; and
    emulation software executable on said user device processor, said emulation software emulating at least some of hardware functionality of at least one dedicated video game platform, wherein said server selectively downloads (1) the emulation software, said emulator displaying a menu of plural video games for selection by the user, and (2) a selected game file including a corresponding binary image file of the game from said video game library to said user device for interoperation with said emulation software so that the user may interact with the user device running the emulation software in conjunction with the selected game file to play the selected video game.

15. The network of claim 14 wherein said user device is disposed, at least in part, within a seat.

16. The network of claim 14 wherein said emulator authenticates said video game files.

17. The network as in claim 14 wherein said emulator includes a pause control that pauses game play in response to a halt command received from a location remote thereto.

18. The network as in claim 14 wherein said user device is diskless.

19. The network as in claim 14 wherein said emulator dynamically configures its functionality based at least in part on the characteristics of particular game files downloaded thereto.

20. A vehicle-based video game system in claim 14 wherein said server is operable to download said emulation software, selected video game files, and non-video game application files;
    said system further comprising a plurality of passenger video game processing devices,
    wherein said processor is operable in a first simulation mode under the control of said emulation software downloaded by said server to display the menu of games from which a passenger selects a game to play and to replicate a graphics function associated with said special purpose video game system to enable simulation of video game play in accordance with one or more of the video game files downloaded by said server associated with the selected game on said first special purpose video game system, and
    wherein said processor is operable in a second mode under the control of one of said non-video game application files downloaded by said server to perform a non-video game application selected via said user interface and to control the display of information related to the non-video game application.

21. The vehicle-based video game system according to claim 20, wherein said passenger video game processing device is disposed, at least in part, within a seat.

22. The vehicle-based video game system according to claim 20, wherein said processor authenticates said video game files.

23. The vehicle-based video game system according to claim 20, wherein said first program includes a pause control that pauses game play in response to a halt command received from a location remote thereto.

24. The vehicle-based video game system according to claim 20, wherein said passenger video game processing device is diskless.

25. The vehicle-based video game system according to claim 20, wherein said first program dynamically configures its functionality based at least in part on the characteristics of particular game files downloaded thereto.

26. The vehicle-based video game system according to claim 20, wherein said moving vehicle comprises an airplane.

27. The vehicle-based video game system according to claim 20, wherein said moving vehicle comprises a train.

28. The vehicle-based video game system according to claim 20, wherein said moving vehicle comprises a bus.

29. The vehicle-based video game system according to claim 20, wherein said moving vehicle comprises a ship.

30. The vehicle-based video game system according to claim 20, wherein said user interface is operable to permit a user to select a game file, wherein said emulation software interprets said game file.

31. The vehicle-based video game system according to claim 20, wherein said user interface is operable to permit a user to select a game file and said selected game file is precompiled or translated for said video game processing device.

32. The vehicle-based video game system according to claim 20, wherein said user interface is operable to permit a user to select a game file and said video game processing device is operable to authenticate said selected game file.

33. The vehicle-based video game system according to claim 20, wherein said video game processing device under the control of said emulation software is operable to display the image of a handheld portable video game player which is being simulated.

34. The vehicle-based video game system according to claim 20, wherein said video game processing device is operable to cause the display of textual information in selectable different languages.

35. The vehicle-based video game system according to claim 20, wherein said video game processing device is operable to cause the pausing of video game play in response to an intercom announcement.

36. The vehicle-based video game system according to claim 20, further including headphones for providing game play audio.

37. The vehicle-based video game system according to claim 20, wherein said video game processing device is operable to decrypt the downloaded game file.

38. The vehicle-based video game system in claim 14 wherein said video game library stores a first program enabling simulation of a first special purpose video game system and a second program enabling simulation of a second structurally different special purpose video game system, and
    wherein the processor is operable to execute at least one of the game files received from the server using said first program received from said server to enable simulation of video game play on said first special purpose video game system, and to execute another of the game files received from the server using at least said second program received from said server to enable simulation of video game play on said second special purpose video game system which is structurally distinct from said first special purpose video game system.

39. The vehicle-based video game system according to claim 38, wherein said first program comprises emulation software executable on said passenger video game processing device, said emulation software emulating at least some of hardware functionality of said first special purpose video game platform, and
    wherein said server selectively downloads a selected game file from said video game library to said passenger video game processing device for interoperation with said emulation software.

40. The vehicle-based video game system according to claim 38, wherein said passenger video game processing device is disposed, at least in part, within a seat.

41. The vehicle-based video game system according to claim 38, wherein said first program authenticates said video game files.

42. The vehicle-based video game system according to claim 38, wherein said passenger video game processing device is diskless.

43. The vehicle-based video game system according to claim 38, wherein said first program dynamically configures its functionality based at least in part on the characteristics of particular game files downloaded thereto.

44. The vehicle-based video game system according to claim 38, wherein said moving vehicle comprises an airplane.

45. The vehicle-based video game system according to claim 38, wherein said moving vehicle comprises a ship.

46. The vehicle-based video game system according to claim 39, wherein said user interface is operable to permit a user to select a game file, wherein said emulation software interprets said game file.

47. The vehicle-based video game system according to claim 38, wherein said user interface is operable to permit a user to select a game file and said selected game file is translated for said video game processing device.

48. The vehicle-based video game system according to claim 38, wherein said first special purpose video game system is a handheld portable video game player and said video game processing device under the control of said first program is operable to display the image of a handheld portable video game player which is being simulated.

49. The vehicle-based video game system according to claim 38, wherein said video game processing device is operable to cause the display of textual information in selectable different languages.

50. The vehicle-based video game system according to claim 38, wherein said video game processing device is operable to decrypt a game file.

51. The method of claim 1, further comprising:
the server authenticating the first appliance to determine if the first appliance is permitted to run the software-based video game platform emulator.

52. The method in claim 1, wherein an executable portion of the game file is encrypted, the method further comprising:
the emulator decrypting the encrypted portion before executing the executable portion of the game file.

53. The method in claim 1, wherein the emulator emulates a security system of the original video game platform.

54. The method in claim 1, further comprising:
the emulator displaying on the appliance an image less than a display size of the appliance in order to simulate a display size used for the original video game platform.

55. The method in claim 54, further comprising:
the emulator displaying one or more display screen labels in a border of the display not used to simulate the size of the display used for the original video game platform.

56. The network as in claim 14 wherein the server authenticates the user device to determine if the user device is permitted to run the emulation software.

57. The network as in claim 14 wherein an executable portion of the game file is encrypted, the user device processor decrypting the encrypted portion before executing the executable portion of the game file.

58. The network as in claim 14 wherein the user device processor executing the emulation software emulates a security system of the one dedicated video game platform.

59. The network as in claim 14 wherein the user device processor executing the emulation software displays on the display an image less than a screen size of the display in order to simulate a display size used for the one dedicated video game platform.

60. The network as in claim 14 wherein the user device processor executing the emulation software displays one or more soft keys display screen labels in a border of the display not used to simulate the display size used for the one dedicated video game platform.

* * * * *